US012568518B2

(12) United States Patent
Yamamoto et al.

(10) Patent No.: US 12,568,518 B2
(45) Date of Patent: Mar. 3, 2026

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 229 days.

(21) Appl. No.: 18/257,853

(22) PCT Filed: Sep. 7, 2021

(86) PCT No.: PCT/JP2021/032854
§ 371 (c)(1),
(2) Date: Jun. 15, 2023

(87) PCT Pub. No.: WO2022/137659
PCT Pub. Date: Jun. 30, 2022

(65) Prior Publication Data
US 2024/0107574 A1 Mar. 28, 2024

(30) Foreign Application Priority Data

Dec. 22, 2020 (JP) ................................. 2020-212654

(51) Int. Cl.
| | |
|---|---|
| *H04W 4/00* | (2018.01) |
| *H04L 1/1812* | (2023.01) |
| *H04L 1/1829* | (2023.01) |
| *H04W 72/56* | (2023.01) |

(52) U.S. Cl.
CPC .......... *H04W 72/56* (2023.01); *H04L 1/1812* (2013.01); *H04L 1/1861* (2013.01)

(58) Field of Classification Search
USPC ................................................. 370/329, 330
See application file for complete search history.

(56) References Cited

U.S. PATENT DOCUMENTS

| | | | |
|---|---|---|---|
| 2019/0052487 A1 | 2/2019 | Shelby et al. | |
| 2023/0039461 A1* | 2/2023 | Gou .................... | H04W 72/563 |

(Continued)

FOREIGN PATENT DOCUMENTS

JP        2020530973 A        10/2020

OTHER PUBLICATIONS

Extended European Search Report dated May 21, 2024, for the corresponding European Patent Application No. 21909817.5, 11 pages.

(Continued)

*Primary Examiner* — Chuong T Ho

(74) *Attorney, Agent, or Firm* — Seed Intellectual Property Law Group LLP

(57) ABSTRACT

A terminal that comprises: a control circuit that, in accordance with information about the size of at least one of a plurality of uplink control signals that have different degrees of priority, varies a parameter that is to be used for transmission of the plurality of uplink control signals; and a transmission circuit that transmits the plurality of uplink control signals.

18 Claims, 12 Drawing Sheets

(56)                    References Cited

U.S. PATENT DOCUMENTS

2023/0318748 A1* 10/2023 Yin ..................... H04L 1/1854
                                                       370/329
2023/0379094 A1* 11/2023 Yin ..................... H04L 1/1854
2023/0379916 A1* 11/2023 Yin ..................... H04L 1/1812

OTHER PUBLICATIONS

Moderator (OPPO), "Summary#1 of email thread [103-e-NR-IIOT_URLLC_enh-04]," R1-2009546, Agenda Item: 8.3.3, 3GPP TSG RAN WG1 #102-e, e-Meeting, Aug. 17-28, 2020, 96 pages.

Lenovo et at., "Intra-UE multiplexing enhancement for IIoT/URLLC," R1-2009104, Agenda Item: 8.3.3, 3GPP TSG RAN WG1 #103-e, e-Meeting, Oct. 26-Nov. 13, 2020. (6 pages).

3GPP TR 38.913 V16.0.0, "3rd Generation Partnership Project; Technical Specification Group Radio Access Network; Study on Scenarios and Requirements for Next Generation Access Technologies; (Release 16)," Jul. 2020. (40 pages).

3GPP TS 23.501 V16.1.0, "3rd Generation Partnership Project; Technical Specification Group Services and System Aspects; System Architecture for the 5G System; Stage 2 (Release 16)," Jun. 2019. (367 pages).

3GPP TS 38.211 V15.6.0, "3rd Generation Partnership Project; Technical Specification Group Radio Access Network; NR; Physical channels and modulation (Release 15)," Jun. 2019. (97 pages).

3GPP TS 38.211 V16.3.0, "3rd Generation Partnership Project; Technical Specification Group Radio Access Network; NR; Physical channels and modulation (Release 16)," Sep. 2020. (133 pages).

3GPP TS 38.212 V16.3.0, "3rd Generation Partnership Project; Technical Specification Group Radio Access Network; NR; Multiplexing and channel coding (Release 16)," Sep. 2020. (152 pages).

3GPP TS 38.213 V16.3.0, "3rd Generation Partnership Project; Technical Specification Group Radio Access Network; NR; Physical layer procedures for control (Release 16)," Sep. 2020. (179 pages).

3GPP TS 38.214 V16.3.0, "3rd Generation Partnership Project; Technical Specification Group Radio Access Network; NR; Physical layer procedures for data (Release 16)," Sep. 2020. (166 pages).

3GPP TS 38.300 V15.6.0, "3rd Generation Partnership Project; Technical Specification Group Radio Access Network; NR; NR and NG-RAN Overall Description; Stage 2 (Release 15)," Jun. 2019. (99 pages).

International Search Report, mailed Dec. 7, 2021, for International Patent Application No. PCT/JP2021/032854. (3 pages) (with English Translation).

International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).

MCC Support, "Final Report of 3GPP TSG RAN WG1 #101-e v1.0.0 (Online meeting, May 25-Jun. 5, 2020)," R1-2005201, 3GPP TSG RAN WG1 Meeting #102-e, e-Meeting, Aug. 17-28, 2020. (223 pages).

Moderator (OPPO), "Summary #1 on Intra-UE Multiplexing/Prioritization for R17," R1-2009045, Agenda Item: 8.3.3, 3GPP TSG RAN WG1 #103-e, e-Meeting, Oct. 26-Nov. 13, 2020. (46 pages).

Nokia et al., "Revised WID: Enhanced Industrial Internet of Things (IoT) and ultra-reliable and low latency communication (URLLC) support for NR," RP-201310 *Revision of RP193233*, Agenda Item: 9.10.5, 3GPP TSG RAN Meeting #88e, Electronic Meeting, Jun. 29-Jul. 3, 2020. (6 pages).

NTT Docomo, Inc., "Discussion on intra-UE multiplexing/prioritization for Rel. 17 URLLC," R1-2009185, Agenda Item: 8.3.3, 3GPP TSG RAN WG1 #103-e, e-Meeting, Oct. 26-Nov. 13, 2020. (11 pages).

\* cited by examiner

200

| | LP HARQ-ACK payload is up to 2 bits | LP HARQ-ACK payload is more than 2 bits and up to 11 bits | LP HARQ-ACK payload is more than 11 bits |
|---|---|---|---|
| HP HARQ-ACK payload is up to 2 bits | Case 1-1 | Case 1-2 | Case 1-3 |
| HP HARQ-ACK payload is more than 2 bits and up to 11 bits | Case 2-1 | Case 2-2 | Case 2-3 |
| HP HARQ-ACK payload is more than 11 bits | Case 3-1 | Case 3-2 | Case 3-3 |

FIG. 5

| | LP HARQ-ACK payload is up to 2 bits | LP HARQ-ACK payload is more than 2 bits and up to 11 bits | LP HARQ-ACK payload is more than 11 bits |
|---|---|---|---|
| HP SR (1 bit) | Case 1-1' | Case 1-2' | Case 1-3' |

FIG. 7

TERMINAL AND COMMUNICATION METHOD

TECHNICAL FIELD

The present disclosure relates to a terminal and a communication method.

BACKGROUND ART

In recent years, a dramatic growth of Internet of Things (IoT) has been expected with the expansion and diversification of radio services as a background. The usage of mobile communication is extending to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. The 5th generation mobile communication systems (5G) can flexibly provide radio communication in response to a wide variety of needs by enhanced mobile broadband (eMBB), massive machine type communication (mMTC), and ultra reliable and low latency communication (URLLC).

The 3rd Generation Partnership Project (3GPP) as an international standardizing body has been specifying New Radio (NR) as one of 5G radio interfaces. NR supports functions for realizing URLLC in conjunction with high speed and high capacity that are basic requirements for eMBB (see, e.g., Non-Patent Literatures (hereinafter referred to as "NPLs") 1 to 4).

CITATION LIST

Non-Patent Literature

NPL 1
  3GPP TS 38.211 V16.3.0, "NR; Physical channels and modulation (Release 16)," 2020-09.
NPL 2
  3GPP TS 38.212 V16.3.0, "NR; Multiplexing and channel coding (Release 16)," 2020-09.
NPL 3
  3GPP TS 38.213 V16.3.0, "NR; Physical layer procedure for control (Release 16)," 2020-09.
NPL 4
  3GPP TS 38.214 V16.3.0, "NR; Physical layer procedures for data (Release 16)," 2020-09.
NPL 5
  3GPP TSG RAN Meeting #88e, RP-201310, "Revised WID Enhanced Industrial Internet of Things (IoT) and ultra-reliable and low latency communication (URLLC) support for NR," Nokia, Nokia Shanghai Bell, Jun. 29-Jul. 3, 2020.
NPL 6
  3GPPTSG RAN WG1 Meeting #102e, R1-2005201, "Final Report of 3GPPTSG RAN WG1 #101-e v1.0.0 (Online meeting, 25 May-5 Jun. 2020)" MCC Support, August 2020.

SUMMARY OF INVENTION

Technical Problem

However, there is scope for further study on a method of improving uplink transmission efficiency in radio communication.

One non-limiting and exemplary embodiment of the present disclosure facilitates providing a terminal and a communication method each capable of improving uplink transmission efficiency in radio communication.

A terminal according to an exemplary embodiment of the present disclosure includes: control circuitry, which, in operation, varies a parameter used for transmission of a plurality of uplink control signals having different priorities, in accordance with information on a size of at least one of the plurality of uplink control signals; and transmission circuitry, which, in operation, transmits the plurality of uplink control signals.

It should be noted that general or specific embodiments may be implemented as a system, a method, an integrated circuit, a computer program, a storage medium, or any selective combination thereof.

According to an exemplary embodiment of the present disclosure, it is possible to improve uplink transmission efficiency in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5 illustrates an exemplary combination of signals to be multiplexed according to Embodiment 1;

FIG. 7 is an exemplary combination of signals to be multiplexed according to Embodiment 2;

DESCRIPTION OF EMBODIMENTS

Hereinafter, embodiments of the present disclosure will be described in detail with reference to the accompanying drawings.

For example, a terminal (also referred to as User Equipment (UE)) may use an uplink control channel (e.g., Physical Uplink Control Channel (PUCCH)) to transmit, to a base station (e.g., also referred to as gNB), a response signal (also referred to as Acknowledgement/Negative Acknowledgement (ACK/NACK) or Hybrid Automatic Repeat Request (HARQ)-ACK) indicating an error detection result of a downlink data signal (e.g., Physical Downlink Shared Channel (PDSCH)), channel state information in downlink (Channel State Information (CSI)), and a radio resource allocation request in uplink (Scheduling Request (SR)). HARQ-ACK, CSI, and SR are also referred to as uplink control information (e.g., Uplink Control Information (UCI)).

It is assumed that a terminal for NR supports a plurality of services (e.g., eMBB and URLLC) having different requirements. For example, in uplink transmission by the terminal, UCIs for the plurality of services having the different requirements may simultaneously occur. Further, for example, in the terminal, transmission resources (e.g., PUCCH resources) allocated for transmission of the respective UCIs for the plurality of services having the different requirements may overlap in terms of time.

In this situation, for example, when a terminal is capable of transmitting a plurality of channels (e.g., a plurality of PUCCHs) at the same time, the terminal can simultaneously transmit UCIs respectively for the plurality of services having different requirements without taking into account the impact on each other. On the other hand, for example, when the terminal is not capable of transmitting the plurality of channels (e.g., the plurality of PUCCHs) at the same time, the terminal may perform an operation such as transmitting a signal of any one of the plurality of channels (i.e., dropping transmission of other channels) or controlling the transmission power for each channel.

For example, a transmission priority (e.g., priority for service) of each of UCIs corresponding to the plurality of services can be determined. In NR Rel. 16, for example, a priority in a physical (PHY) layer of a UCI to be transmitted by a terminal is configurable (e.g., see NPL 3). In a case where UCI transmissions overlap in terms of time, for example, the terminal may transmit UCI with a high priority and drop transmission of UCI with a low priority, based on information on the priority of each UCI in the PHY layer.

Figure 1:
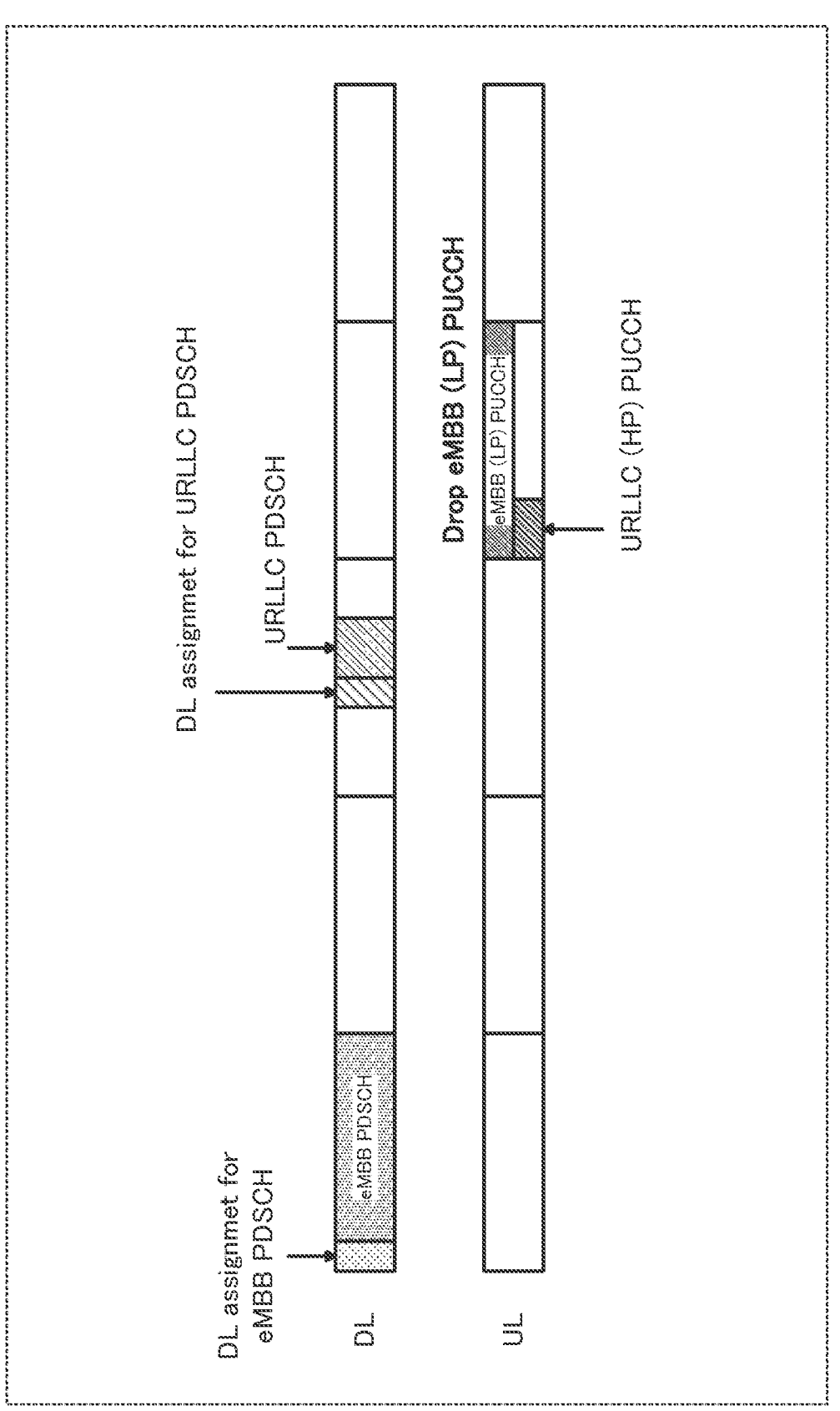
FIG. 1 illustrates an example of transmission of an uplink signal.

FIG. 1 illustrates an example of transmission of an uplink signal. FIG. 1 illustrates an example of overlap in terms of time between transmission of HARQ-ACK for URLLC transmission which is configured with a high priority (HP) (hereinafter also referred to as "high-priority HARQ-ACK") and transmission of HARQ-ACK for eMBB which is configured with a low priority (LP) (hereinafter also referred to as "low-priority HARQ-ACK"). In the example illustrated in FIG. 1, the terminal drops the transmission of the HARQ-ACK for the eMBB transmission which is configured with a low priority and transmits the HARQ-ACK for the URLLC transmission which is configured with a high priority.

In this case, the terminal can transmit the HARQ-ACK for the URLLC transmission which is configured with a high priority, without being affected by another channel (e.g., channel corresponding to eMBB transmission). Meanwhile, the HARQ-ACK for the eMBB transmission which is configured with a low priority is not transmitted regardless of a decoding result of PDSCH for the eMBB transmission (e.g., decoding succeeded or decoding failed), which makes it difficult for a base station to determine whether the terminal has correctly decoded PDSCH for the eMBB transmission. Consequently, for example, PDSCH for the eMBB transmission is retransmitted regardless of the decoding result in the terminal, and thus, spectral efficiency of downlink transmission may be deteriorated.

In NR Rel. 17, as a method of suppressing the deterioration in the spectral efficiency of the downlink transmission, for example, a method has been studied in which UCIs having different priorities are transmitted by multiplexing on the same uplink resource (e.g., PUCCH resource) (e.g., see NPL 5). By way of example, the scenario studied in NR Rel. 17 includes multiplexing of the high-priority HARQ-ACK and the low-priority HARQ-ACK, multiplexing of high-priority SR and the low-priority HARQ-ACK, and multiplexing of the high-priority SR, the high-priority HARQ-ACK, and the low-priority HARQ-ACK (see, e.g., NPL 6).

Exemplary encoding methods in a case where the terminal transmits a UCI having a high priority (hereinafter may also be referred to as a high-priority UCI) and a UCI having a low priority (hereinafter may also be referred to as a low-priority UCI) by multiplexing on the same PUCCH resource include, for example, a method in which the high-priority UCI and the low-priority UCI are jointly encoded (hereinafter referred to as "Joint coding"), a method in which the high-priority UCI and the low-priority UCI are independently (or separately) encoded (hereinafter referred to as "Separate coding"), and a method in which the Joint coding and the Separate coding are combined with each other.

The Joint coding is a method that is applied, for example, when UCIs having the same priority in NR are transmitted by multiplexing on a PUCCH resource. Applying the Joint coding to the multiplexing of UCIs having different priorities is advantageous from the viewpoint of simplicity in implementation for a terminal. In the Joint coding, however, at least one of a coding rate and resource allocation for each of the UCIs with different priorities may not be appropriately configured. For example, for a UCI which has a higher priority and for which higher reliability is required as compared with other UCIs, it may be assumed that a lower coding rate is configured in encoding, in order to meet the requirements. In the Joint coding, for example, even in encoding on a low-priority UCI, the low coding rate as for the high-priority UCI is configured, which is inefficient from the viewpoint of the resource-utilization efficiency. Further, in the Joint coding, for example, when a coding rate in accordance with the requirements of the low-priority UCI is configured, the same coding rate is configured even for the high-priority UCI, which may deteriorate the transmission quality of the high-priority UCI.

By contrast, in the Separate coding, for example, UCIs with different priorities are individually encoded, which makes it possible to suppress a decrease in the resource-utilization efficiency or the transmission quality described in the Joint coding. Whereas, when a plurality of times of encoding is used in the Separate coding, overhead may be increased by a Cyclic Redundancy Check (CRC) bit being added for each encoding. Moreover, for example, an increase in the number of encodings which is applied by the terminal to transmit a signal of PUCCH (e.g., UCI) may increase the amount of implementation processing for a terminal. For example, an increase in the number of encodings caused by a Polar encoder adopted in NR as a UCI encoding method is undesirable from the viewpoint of simplicity in implementation for a terminal.

Further, when the Joint coding and the Separate coding are combined, there is scope for further study on a method of selecting the Joint coding and the Separate coding.

In NR, a PUCCH format that is in accordance with the number of UCI bits is specified. For example, in a case where a UCI of up to two bits is transmitted, either PUCCH format 0 or PUCCH format 1 is used. Here, since the UCI encoding is not used for PUCCH format 0 and PUCCH format 1, there is scope for further study also on a transmission method in a case where the total of UCIs after multiplexing is up to two bits.

Therefore, in a non-limiting and exemplary embodiment of the present disclosure, a description will be given of a method of improving the transmission efficiency of an uplink signal (e.g., resource-utilization efficiency, transmission quality, or simplicity in implementation for terminal) in a case (scenario) where uplink-signal (e.g., UCI) transmissions having different priorities overlap in terms of time.

For example, features related to the radio communication in NR include the following features.

1. For example, NR has no appropriate encoding method for a UCI of one or two bits. Thus, for example, in a situation where the UCI of one or two bits is multiplexed with another UCI, it is difficult for the UCI of one or two bits to obtain a coding gain even when an encoding method suitable for the other UCI is applied to the UCI of one or two bits.

2. For example, in NR, a block code (e.g., Reed Muller (RM) code) is used for a UCI of more than 2 bits and up to 11 bits. A CRC may be added in the block code, but in NR, from the viewpoint from a reduction in overhead, the CRC need not be added in encoding of the UCI of more than 2 bits and up to 11 bits.

From the above-mentioned features 1 and 2, for example, when the number of bits for a UCI with a low priority or a high priority is one or two bits, or when the number of bits for a UCI after the multiplexing is relatively small (e.g., when equal to or less than threshold), application of the Joint coding can improve the transmission efficiency as compared with the Separate coding.

3. For example, the larger the number of bits for a UCI with a low priority or a high priority is, the smaller the ratio of CRC overhead occupying the number of UCI bits is. Moreover, the larger the number of UCI bits is, the greater the PUCCH resource amount is. Thus, for example, the larger the number of bits for a UCI with a low priority or a high priority is, the smaller the impact on the entire UCI bits caused by the increased CRC overhead due to individual encoding on each UCI is.

From the above-mentioned feature 3, for example, when the number of bits for a UCI with a low priority or a high priority is relatively large (e.g., when larger than threshold), application of the Separate coding can improve the transmission efficiency as compared with the Joint coding, from the viewpoint of the resource-utilization efficiency. Further, for example, from the feature 2, for example, the CRC need not be added when the number of UCI bits to be individually encoded in the Separate coding is up to 11 bits, and thus, a decrease in the resource-utilization efficiency can be suppressed.

4. For example, from the viewpoint of simplicity in implementation for a terminal, it is desirable to limit the number of encodings (e.g., the number of Polar encodings). For example, when encoding by a Polar code is configured for each of a low-priority UCI and a high-priority UCI, application of the Joint coding can reduce the number of encodings as compared with the Separate coding, thereby improving the transmission efficiency.

5. For example, in NR, a PUCCH format that is in accordance with the number of UCI bits is specified. For example, PUCCH format 0 or PUCCH format 1 may be configured for a UCI of up to two bits, and PUCCH format 2, 3, or 4 may be configured for a UCI of more than two bits.

In a non-limiting and exemplary embodiment of the present disclosure, for example, taking into account the above-mentioned features, a terminal may control multiplexing of UCIs on PUCCH based on at least one parameter (or element) relating to an uplink signal, such as the number of bits for a UCI with a low priority, the number of bits for a UCI with a high priority, the number of bits for a UCI after multiplexing, a PUCCH format, or limitation of the number of encodings (e.g., information on upper limit value of the number of encodings in the terminal). For example, the terminal may vary a transmission method for PUCCH or a parameter, based on these parameters relating to the uplink signal, and/or may flexibly configure the transmission method for PUCCH or the parameter. In a non-limiting and exemplary embodiment of the present disclosure, control of the UCI multiplexing may include, for example, at least one of an encoding method for a UCI (e.g., either Joint coding or Separate coding), a mapping method for a UCI to a PUCCH resource, a PUCCH format after the UCI multiplexing, and parameter configurations for these.

Embodiment 1

[Overview of Communication System]

A communication system according to each embodiment of the present disclosure includes base station 100 and terminal 200.

Figure 2:
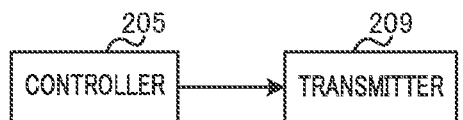
FIG. 2 is a block diagram illustrating an exemplary configuration of part of a terminal.

FIG. 2 is a block diagram illustrating an exemplary configuration of part of terminal 200 according to an exemplary embodiment of the present disclosure. In terminal 200 illustrated in FIG. 2, receiver 205 (e.g., corresponding to control circuitry) varies a parameter used for transmission of a plurality of uplink control signals (e.g., UCIs) having different priorities, in accordance with information on a size (e.g., the number of bits) of at least one of the plurality of uplink control signals. Transmitter 209 (e.g., corresponding to transmission circuitry) transmits the plurality of uplink control signals.

[Configuration of Base Station]

Figure 3:
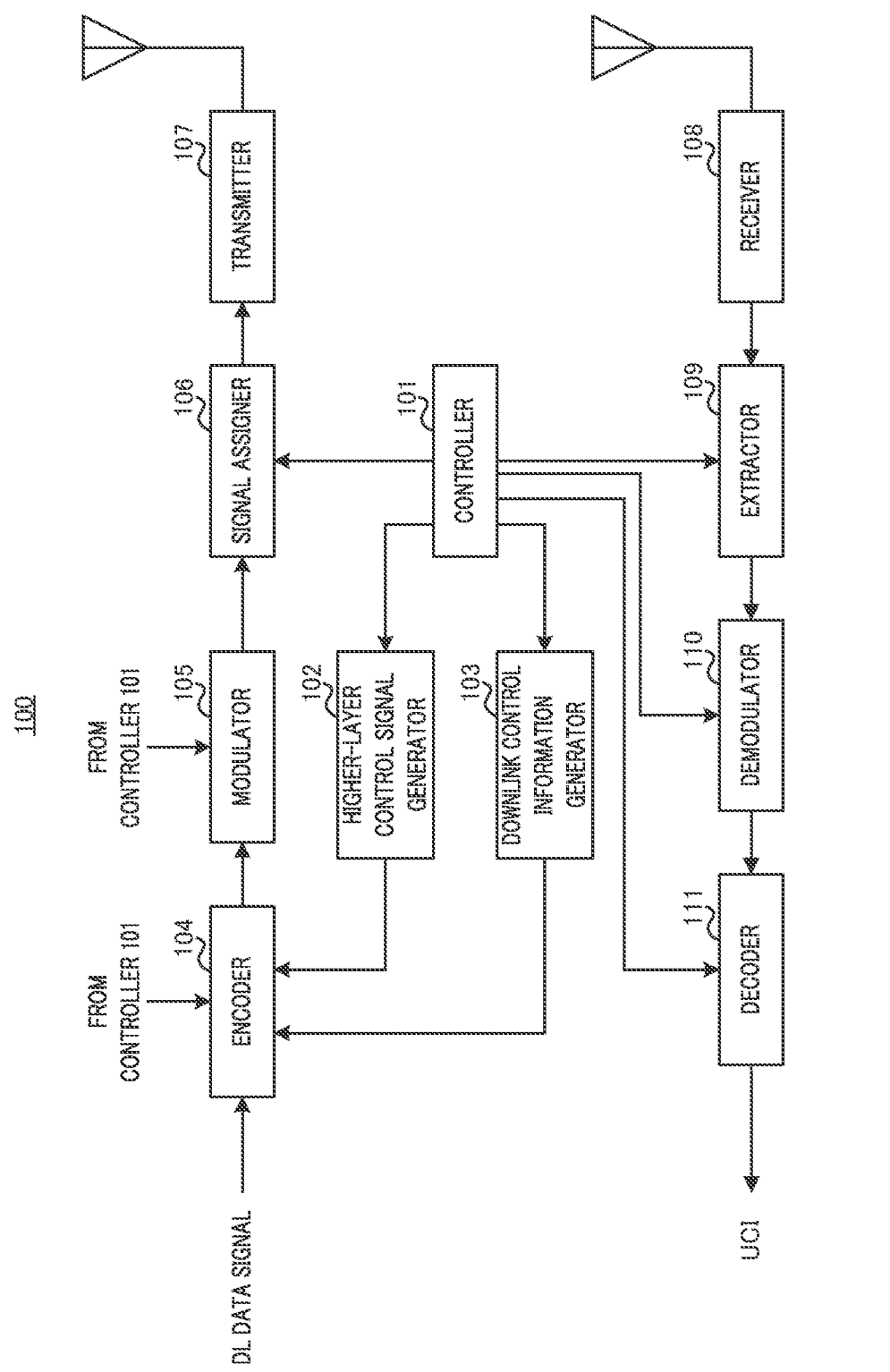
FIG. 3 is a block diagram illustrating an exemplary configuration of a base station.

FIG. 3 is a block diagram illustrating an exemplary configuration of base station 100 according to Embodiment 1. In FIG. 3, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101 determines, for example, information on a downlink signal for transmission of a downlink data signal (e.g., PDSCH). The information on the downlink signal may include information such as a Modulation and Coding Scheme (MCS) of a data signal to be transmitted via PDSCH and radio resource allocation for PDSCH. Controller 101, for example, outputs the determined information to encoder 104, modulator 105, and signal assigner 106. In addition, controller 101 outputs the information on the downlink signal to downlink control information generator 103.

Controller 101 also determines, for example, information on transmission of an uplink control signal (e.g., UCI), which is performed by terminal 200. The information on the UCI transmission may include information on a UCI encoding method, a UCI mapping method to PUCCH, a PUCCH format after the UCI multiplexing, or parameters corresponding to these. Controller 101 outputs, to extractor 109 and decoder 111, the determined information on the UCI transmission, for example.

Controller 101 outputs the determined information on the UCI transmission also to higher-layer control signal generator 102 or downlink control information generator 103. The information to be output to higher-layer control signal generator 102 may include, for example, information on a PUCCH resource set (e.g., candidate for PUCCH resource), information on a maximum coding rate of a UCI, or information on a priority of a UCI. Meanwhile, the information to be output to downlink control information generator 103 may include, for example, information indicating a PUCCH resource allocated to terminal 200 in the PUCCH resource set or information on a priority of a UCI.

Furthermore, controller 101 determines, for example, information on a downlink signal (e.g., encoding and modulation scheme (MCS) and radio resource allocation) for transmission of a higher control signal or a downlink control signal and then outputs the determined information to encoder 104, modulator 105, and signal assigner 106.

Higher-layer control signal generator 102, for example, generates a higher-layer control signal bit string based on the information input from controller 101 and outputs the higher-layer control signal bit string to encoder 104.

Downlink control information generator 103, for example, generates a downlink control information (e.g., DCI) bit string based on the information input from controller 101 and outputs the generated DCI bit string to encoder 104. Note that, the control information may be transmitted to a plurality of terminals.

Encoder 104, for example, encodes downlink data (e.g., DL data signal), the bit string input from higher-layer control signal generator 102, or the DCI bit string input from downlink control information generator 103, based on the information input from controller 101. Encoder 104 outputs the encoded bit string to modulator 105.

Modulator 105, for example, modulates the encoded bit string input from encoder 104, based on the information input from controller 101, and outputs the modulated signal (e.g., symbol string) to signal assigner 106.

Signal assigner 106 maps, to a radio resource, the symbol string (including, for example, downlink data signal or control signal) input from modulator 105, based on the radio resource-indicating information input from controller 101, for example. Signal assigner 106 outputs, to transmitter 107, a downlink signal to which the signal is mapped.

Transmitter 107, for example, performs transmission-waveform generation processing such as orthogonal Frequency Division Multiplexing (OFDM) on the signal input from signal assigner 106. In addition, for example, in the case of an OFDM transmission in which a cyclic prefix (CP) is added, transmitter 107 performs Inverse Fast Fourier Transform (IFFT) processing on the signal, and adds the CP to the signal resulting from the IFFT. Moreover, transmitter 107 performs RF processing such as D/A conversion or up-conversion on the signal and transmits the resulting radio signal to terminal 200 via an antenna.

Receiver 108, for example, performs RF processing such as down-conversion or A/D conversion on the uplink signal received from terminal 200 via the antenna. Further, in the case of the OFDM transmission, receiver 108 performs Fast Fourier Transform (FFT) processing on the received signal and outputs the resulting frequency-domain signal to extractor 109.

Extractor 109, for example, extracts, based on the information input from controller 101, a radio resource part with which the uplink signal (e.g., PUCCH) to be transmitted by terminal 200 is transmitted and then outputs the extracted radio resource part to demodulator 110.

Demodulator 110, for example, demodulates the uplink control signal (e.g., PUCCH) input from extractor 109, based on the information input from controller 101. Demodulator 110, for example, outputs a demodulation result to decoder 111.

Decoder 111, for example, performs error correction decoding on the uplink signal (e.g., PUCCH) based on the information input from controller 101 and the demodulation result input from demodulator 110, and obtains a reception bit sequence (e.g., UCI) after the decoding. Here, in a case where UCIs having different priorities are multiplexed, for example, decoder 111 may determine an encoding method (e.g., Joint coding or Separate coding) for the UCIs having different priorities, based on methods described later, and then perform the error correction decoding on PUCCH.

[Configuration of Terminal]

Figure 4:
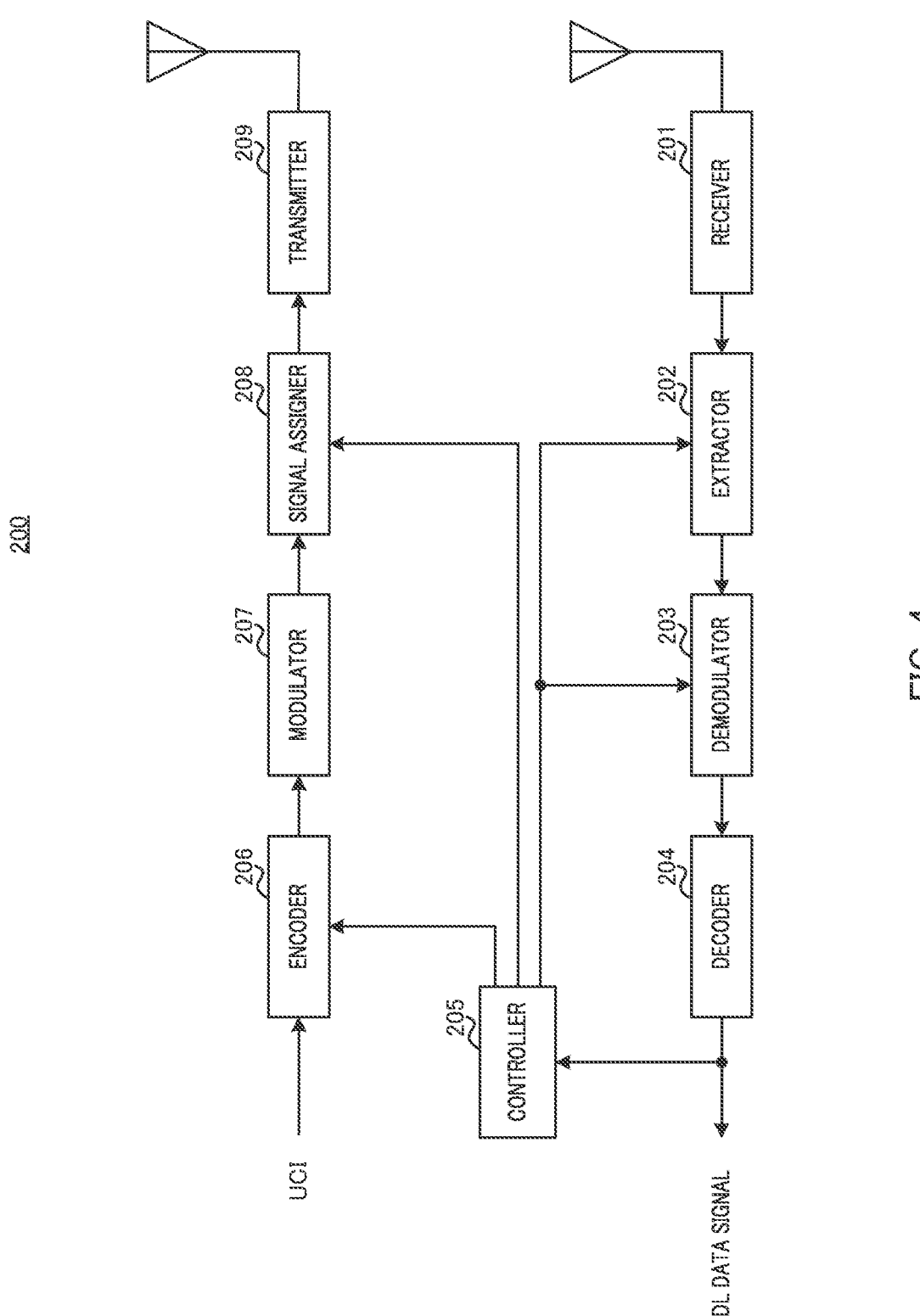
FIG. 4 is a block diagram illustrating an exemplary configuration of the terminal.

FIG. 4 is a block diagram illustrating an exemplary configuration of terminal 200 according to an exemplary embodiment of the present disclosure. For example, in FIG. 4, terminal 200 includes receiver 201, extractor 202, demodulator 203, decoder 204, controller 205, encoder 206, modulator 207, signal assigner 208, and transmitter 209.

Receiver 201, for example, receives a downlink signal (e.g., downlink data signal or downlink control information) from base station 100 via an antenna, performs the RF processing such as the down-conversion or the A/D conversion on the received radio signal and obtains a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts, from the received signal input from receiver 201, a radio resource part, which may include the downlink control information, based on information on a radio resource in the downlink control information input from controller 205, and outputs the radio resource part to demodulator 203. Further, extractor 202 extracts a radio resource part, which includes downlink data, based on information on a radio resource for a data signal input from controller 205, and outputs the radio resource part to demodulator 203.

Demodulator 203, for example, based on the information input from controller 205, demodulates the signal (e.g., PDCCH or PDSCH) input from extractor 202 and outputs the demodulation result to decoder 204.

Decoder 204, for example, performs error correction decoding on PDCCH or PDSCH, using the demodulation result input from demodulator 203, and obtains downlink reception data, a higher-layer control signal, or downlink control information, for example. Decoder 204 outputs the higher-layer control signal and the downlink control information to controller 205, and outputs the downlink reception data. Further, decoder 204 may generate a response signal (e.g., ACK/NACK) based on the decoding result of the downlink reception data and output the generated response signal to encoder 206.

Controller 205, for example, determines a radio resource for a PDSCH reception or a PUCCH transmission, based on the signal input from decoder 204 (e.g., higher layer control signal and downlink control information). Controller 205 outputs the determined information to extractor 202 and signal assigner 208, for example.

Controller 205 may, for example, determine a UCI encoding method, a UCI mapping method to PUCCH, a PUCCH format after the UCI multiplexing, and parameters corresponding to these, based on information on the UCI transmission performed by terminal 200, which can be obtained from the higher layer control signal and the downlink control information. Controller 205 outputs the determined information to encoder 206, modulator 207, and signal assigner 208, for example.

Encoder 206, for example, performs error correction encoding on the UCI (UCI sequence) based on the information input from controller 205 (e.g., UCI encoding method, UCI mapping method to PUCCH, PUCCH format after UCI multiplexing, and parameters corresponding to these). Encoder 206 outputs the encoded bit string to modulator 207. Meanwhile, when multiplexing UCIs having different priorities, for example, encoder 206 may determine an encoding method (e.g., Joint coding or Separate coding) for the UCIs having different priorities, based on methods described later, and then perform the error correction encoding.

Modulator 207, for example, modulates the encoded bit string input from encoder 206 and outputs the modulated signal (symbol string) to signal assigner 208. In a case where an encoded bit string with a different encoding method (e.g., Separate coding) applied is input, for example, modulator 207 may perform modulation processing on each encoded bit string.

Signal assigner 208, for example, maps the signal input from modulator 207 to a radio resource (e.g., radio resource for PUCCH) based on the information input from controller 205, and then outputs the uplink signal to which the signal is mapped to transmitter 209.

Transmitter 209, for example, performs transmission signal-waveform generation such as OFDM on the signal input from signal assigner 208. In addition, in the case of the OFDM transmission using the CP, for example, transmitter 209 performs the IFFT processing on the signal and adds the CP to the signal after the IFFT. Alternatively, when transmitter 209 generates a single-carrier waveform, a Discrete Fourier Transformer (DFT) may be additionally provided at a rear stage of modulator 207 or a front stage of signal assigner 208 (neither is illustrated), for example. Moreover, transmitter 209, for example, performs the RF processing such as the D/A conversion or the up-conversion on a transmission signal and transmits the resulting radio signal to base station 100 via the antenna.

Exemplary Operations of Base Station 100 and Terminal 200

Exemplary operations of base station 100 and terminal 200 having the above configurations will be described.

In the present embodiment, as an example of UCI multiplexing, a case will be described where a high-priority HARQ-ACK (HP HARQ-ACK) and a low-priority HARQ-ACK (LP HARQ-ACK) are multiplexed on the same PUCCH.

For example, as illustrated in FIG. 5, a description will be given of case classification in accordance with the number of bits for the high-priority HARQ-ACK and the number of bits for the low-priority HARQ-ACK. In the example illustrated in FIG. 5, the high-priority HARQ-ACK and the low-priority HARQ-ACK are classified into nine cases (Case 1-1 to Case 3-3) in which the number of bits (e.g., HARQ-ACK payload size) is up to 2 bits, the number of bits is more than 2 bits and up to 11 bits, and the number of bits is more than 11 bits.

In FIG. 5, HARQ-ACK bundling may be applied to both or either the high-priority HARQ-ACK and/or the low-priority HARQ-ACK. When the HARQ-ACK bundling is applied, the number of bits for each of the high-priority HARQ-ACK and the low-priority HARQ-ACK may be the number of bits before the HARQ-ACK bundling or the number of bits after the HARQ-ACK bundling. Alternatively, the number of bits may be the number of bits before the HARQ-ACK bundling as for the high-priority HARQ-ACK and may be the number of bits after the HARQ-ACK bundling as for the low-priority HARQ-ACK. Alternatively, the number of bits may be the number of bits after the HARQ-ACK bundling as for the high-priority HARQ-ACK and may be the number of bits before the HARQ-ACK bundling as for the low-priority HARQ-ACK.

In the following, descriptions will be given of transmission methods of UCIs (hereinafter may also be referred to as UCI transmission method) in the respective cases (Case 1-1 to Case 3-3) indicated in FIG. 5.

[Case 1-1]

Case 1-1 is when the number of bits for the high-priority HARQ-ACK is up to two bits and the number of low-priority HARQ-ACK bits is up to two bits.

In Case 1-1, a PUCCH format for each HARQ-ACK before multiplexing is PUCCH format 0 or PUCCH format 1. The number of HARQ-ACK bits after the multiplexing is two to four bits.

In Case 1-1, application of the Joint coding is effective because the number of bits after the multiplexing is small as compared with other cases. Also, in Case 1-1, a PUCCH format may be configured in accordance with the number of bits after the multiplexing.

Hereinafter, Option 1-1-1 and Option 1-1-2 will be described as exemplary UCI transmission methods in Case 1-1.

<Option 1-1-1>

In a case where the total number of bits for the high-priority HARQ-ACK and the low-priority HARQ-ACK is up to two bits (e.g., when both the number of high-priority HARQ-ACK bits and the number of low-priority HARQ-ACK bits are one bit), terminal 200 may multiplex and transmit the high-priority HARQ-ACK and the low-priority HARQ-ACK by using PUCCH format 0 or PUCCH format 1. In other words, when the total number of bits is up to two bits, terminal 200 may perform the Joint coding by using PUCCH format 0 or PUCCH format 1.

As a PUCCH resource for multiplexing of a plurality of HARQ-ACKs, the PUCCH resource (or PUCCH resource set) for the high-priority HARQ-ACK may be used, for example.

Meanwhile, in a case where the total number of bits for the high-priority HARQ-ACK and the low-priority HARQ-ACK is more than two bits (e.g., when either or both the number of high-priority HARQ-ACK bits or/and the number of low-priority HARQ-ACK bits is/are two bits), terminal 200 may multiplex and transmit the high-priority HARQ-ACK and the low-priority HARQ-ACK by using PUCCH format 2, 3, or 4. In other words, when the total number of bits is more than two bits, terminal 200 may perform the Joint coding by using PUCCH format 2, 3, or 4.

Further, when the total number of bits is more than two bits, for example, terminal 200 may perform the Joint coding on the high-priority HARQ-ACK and the low-priority HARQ-ACK by using the block code (e.g., RM code). As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method, the resource mapping method, and the PUCCH-format selection method in Option 1-1-1 are similar to the methods in the multiplexing of HARQ-ACKs having the same priority in NR Rel. 15/16, for example, which is thus advantageous in simplicity in implementation for terminal 200.

<Option 1-1-2>

In a case where the total number of bits for the high-priority HARQ-ACK and the low-priority HARQ-ACK is up to two bits (e.g., when both the number of high-priority HARQ-ACK bits and the number of low-priority HARQ-ACK bits are one bit), terminal 200 may multiplex and transmit the high-priority HARQ-ACK and the low-priority HARQ-ACK by using PUCCH format 0 or PUCCH format 1. In other words, when the total number of bits is up to two bits, terminal 200 may perform the Joint coding by using PUCCH format 0 or PUCCH format 1.

As a PUCCH resource for multiplexing of a plurality of HARQ-ACKs, the PUCCH resource (or PUCCH resource set) for the high-priority HARQ-ACK may be used, for example.

Meanwhile, in a case where the total number of bits for the high-priority HARQ-ACK and the low-priority HARQ-ACK is three bits (e.g., when either the number of high-priority HARQ-ACK bits or the number of low-priority HARQ-ACK bits is one bit and the other one is two bits) and the PUCCH resource for the high-priority HARQ-ACK is PUCCH format 0, terminal 200 may multiplex and transmit the high-priority HARQ-ACK and the low-priority HARQ-ACK by using PUCCH format 0. In other words, terminal 200 may perform the Joint coding by using PUCCH format 0.

Further, in a case where the total number of bits for the high-priority HARQ-ACK and the low-priority HARQ-ACK is three bits (e.g., when either the number of high-priority HARQ-ACK bits or the number of low-priority HARQ-ACK bits is one bit and the other one is two bits) and the PUCCH resource for the high-priority HARQ-ACK is PUCCH format 1, or the total number of bits for the high-priority HARQ-ACK and the low-priority HARQ-ACK is four bits, terminal 200 may multiplex and transmit the high-priority HARQ-ACK and the low-priority HARQ-ACK by using PUCCH format 2, 3, or 4. In other words, terminal 200 may perform the Joint coding by using PUCCH format 2, 3, or 4.

In a case where the total number of bits is three bits and the PUCCH resource for the high-priority HARQ-ACK is PUCCH format 1, or the total number of bits is four bits, for example, terminal 200 may perform the Joint coding on the high-priority HARQ-ACK and the low-priority HARQ-ACK by using the block-code (e.g., RM code). As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

Here, in NR, a method of multiplexing and transmitting SRs without changing a PUCCH format when terminal 200 transmits an HARQ-ACK using PUCCH format 0 is specified (e.g., see NPL 3). For example, terminal 200 can use eight cyclic shift sequences to transmit information (e.g., information indicating eight patterns) including a two-bit HARQ-ACK and a one-bit SR (e.g., information indicating the presence or absence of SR). In Option 1-1-2, for example, in a case where the total number of bits for the high-priority HARQ-ACK and the low-priority HARQ-ACK is three bits and the PUCCH resource for the high-priority HARQ-ACK is PUCCH format 0, terminal 200 may use eight cyclic shift sequences to transmit the HARQ-ACK the total number of which is three bits, as in the multiplexing method for an HARQ-ACK and an SR in NR.

In Option 1-1-2, for example, in a case where the total number of bits is three bits and the PUCCH resource for the high-priority HARQ-ACK is PUCCH format 0, the PUCCH format for the high-priority HARQ-ACK need not be changed. For example, since the transmission using PUCCH format 0 is one-resource-block transmission, the resource-utilization efficiency can be improved as compared with PUCCH format 2 or 3.

In Option 1-1-2, a case has been described where terminal 200 multiplexes and transmits the high-priority HARQ-ACK and the low-priority HARQ-ACK by using PUCCH format 0 when the number of bits after the UCI multiplexing is three bits and the PUCCH for the high-priority HARQ-ACK is PUCCH format 0. Similarly, for example, when the number of bits after the UCI multiplexing is three bits and the PUCCH for the high-priority HARQ-ACK is PUCCH format 1, terminal 200 may multiplex and transmit the high-priority HARQ-ACK and the low-priority HARQ-ACK by using PUCCH format 1. In this case, configuring a modulation scheme applied to PUCCH format 1 as eight PSKs (eight-Phase Shift Keying) enables terminal 200 to transmit the three-bit UCI by using PUCCH format 1.

[Case 1-2]

Case 1-2 is when the number of bits for the high-priority HARQ-ACK is up to 2 bits and the number of bits for the low-priority HARQ-ACK is more than 2 bits and up to 11 bits.

In Case 1-2, a PUCCH format for the high-priority HARQ-ACK before the multiplexing is PUCCH format 0 or PUCCH format 1. By contrast, a PUCCH format for the low-priority HARQ-ACK before the multiplexing is PUCCH format 2, 3, or 4.

The number of HARQ-ACK bits after the multiplexing is 4 to 13 bits. Therefore, in Case 1-2, PUCCH format 2, 3, or 4 may be configured as the PUCCH format for the multiplexing of HARQ-ACKs.

Besides, in Case 1-2, there is scope for further study on an encoding method and a resource mapping method. Hereinafter, Option 1-2-1 and Option 1-2-2 will be described as exemplary UCI transmission methods in Case 1-2.

<Option 1-2-1>

Terminal 200 may, for example, perform the Joint coding on the high-priority HARQ-ACK and the low-priority HARQ-ACK and then multiplex and transmit them by using PUCCH format 2, 3 or 4.

Further, in a case where the total number of bits for the high-priority HARQ-ACK and the low-priority HARQ-ACK is up to 11 bits, terminal 200 may perform the Joint coding on the HARQ-ACK after the multiplexing by using the block code (RM code), for example. On the other hand, when the total number of bits is more than 11 bits, terminal 200 may perform the Joint coding on the HARQ-ACK after the multiplexing by using the Polar code, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 1-2-1 are similar to the methods in the multiplexing of HARQ-ACKs having the same priority in NR Rel. 15/16, for example, which is thus advantageous in simplicity in implementation for terminal 200.

<Option 1-2-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the low-priority HARQ-ACK by the block code (e.g., RM code) and map the encoded UCI bits to a PUCCH resource based on a method similar to the method in NR Rel. 15/16 (see, e.g., NPL 2 or 3).

Further, terminal 200 may, for example, map the high-priority HARQ-ACK to the PUCCH resource by puncturing into a portion of the resource to which the low-priority HARQ-ACK has been mapped. Terminal 200 may also encode the high-priority HARQ-ACK by a Repetition code, for example.

The resource amount to be allocated to the one- or two-bit high-priority HARQ-ACK in PUCCH (e.g., the number of resource elements (REs)) may be determined according to, for example, the following Equation 1.

[1]

$$Q'_{ACK}=[O_{ACK}/(\text{coderate}*\text{Modulation order})] \qquad \text{(Equation 1)}$$

In Equation 1, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Meanwhile, in the PUCCH resource, the high-priority HARQ-ACK may be mapped to an RE that is different from a resource element (RE) to which a reference signal (RS) is mapped, according to a Frequency-first-time-second format (manner), or may be mapped to a symbol closer to an RS symbol.

The encoding method in Option 1-2-2 allows configuration of an appropriate coding rate or resource allocation for each of the HARQ-ACKs with different priorities. Further, in Option 1-2-2, for example, even when the Separate coding is applied, the number of bits for each of the high-priority HARQ-ACK and the low-priority HARQ-ACK is relatively small (e.g., 4 to 13 bits), and the CRC is not easily to be added thereto; hence, an increase in overhead due to the CRC is unlikely to occur.

Further, in Option 1-2-2, the resource mapping of the low-priority HARQ-ACK is performed in a similar manner to the method in NR Rel. 15/16, and the high-priority HARQ-ACK is punctured and mapped to the PUCCH resource to which the low-priority HARQ-ACK has been mapped, which suppresses an increase in the amount of implementation processing for terminal 200.

<Option 1-2-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Repetition code and then map the encoded UCI bits to the PUCCH resource. Further, terminal 200 may, for example, encode the low-priority HARQ-ACK by the block code (e.g., RM code) and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 1-2-3 allows configuration of an appropriate coding rate or resource allocation for each of the HARQ-ACKs with different priorities. Further, in Option 1-2-3, for example, even when the Separate coding is applied, the number of bits for each of the high-priority HARQ-ACK and the low-priority HARQ-ACK is relatively small (e.g., 4 to 13 bits), and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 1-2-3, thus suppressing an increase in the amount of implementation processing for terminal 200.

[Case 1-3]

Case 1-3 is when the number of bits for the high-priority HARQ-ACK is up to 2 bits and the number of bits for the low-priority HARQ-ACK is more than 11 bits.

In Case 1-3, a PUCCH format for the high-priority HARQ-ACK before the multiplexing is PUCCH format 0 or PUCCH format 1. By contrast, a PUCCH format for the low-priority HARQ-ACK before the multiplexing is PUCCH format 2, 3, or 4.

The number of HARQ-ACK bits after the multiplexing is more than 12 bits. Therefore, in Case 1-3, PUCCH format 2, 3, or 4 may be configured as the PUCCH format for multiplexing of HARQ-ACKs.

Besides, in Case 1-3, there is scope for further study on an encoding method and a resource mapping method. Hereinafter, Option 1-3-1 and Option 1-3-2 will be described as exemplary UCI transmission methods in Case 1-3.

<Option 1-3-1>

Terminal 200 may, for example, perform the Joint coding on the high-priority HARQ-ACK and the low-priority HARQ-ACK and then multiplex and transmit them by using PUCCH format 2, 3 or 4. Further, terminal 200 may perform the Joint coding, by the Polar code, on the HARQ-ACK after the multiplexing, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 1-3-1 are similar to the methods in the multiplexing of HARQ-ACKs having the same priority in NR Rel. 15/16, for example, which is thus advantageous in simplicity in implementation for terminal 200.

<Option 1-3-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the low-priority HARQ-ACK by the Polar code and map the encoded UCI bits to a PUCCH resource based on a method similar to the method in NR Rel. 15/16 (see, e.g., NPL 2 or 3).

Further, terminal 200 may, for example, map the high-priority HARQ-ACK to the PUCCH resource by puncturing into a portion of the resource to which the low-priority HARQ-ACK has been mapped. Terminal 200 may also encode the high-priority HARQ-ACK by a Repetition code, for example.

The resource amount to be allocated to the one- or two-bit high-priority HARQ-ACK in PUCCH (e.g., the number of REs) may be determined according to, for example, the following Equation 2.

[2]

$$Q'_{ACK}=[O_{ACK}/(\text{coderate*Modulation order})] \qquad \text{(Equation 2)}$$

In Equation 2, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Meanwhile, in the PUCCH resource, the high-priority HARQ-ACK may be mapped to an RE that is different from an RE to which an RS is mapped, according to a Frequency-first-time-second format (manner), or may be mapped to a symbol closer to an RS symbol.

The encoding method in Option 1-3-2 allows configuration of an appropriate coding rate or resource allocation for each of the HARQ-ACKs with different priorities. Further, in Option 1-3-2, for example, even when the Separate coding is applied, the number of bits for each of the high-priority HARQ-ACK and the low-priority HARQ-ACK is relatively small (e.g., 4 to 13 bits), and the CRC is not easily to be added thereto; hence, an increase in overhead due to the CRC is unlikely to occur.

Further, in Option 1-3-2, the resource mapping of the low-priority HARQ-ACK is performed in a similar manner to the method in NR Rel. 15/16, and the high-priority HARQ-ACK is punctured and mapped to the PUCCH resource to which the low-priority HARQ-ACK has been mapped, which suppresses an increase in the amount of implementation processing for terminal 200.

<Option 1-3-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Repetition code and then map the encoded UCI bits to the PUCCH resource. Further, terminal 200 may, for example, encode the low-priority HARQ-ACK by the Polar code and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 1-3-3 allows configuration of an appropriate coding rate or resource allocation for each of the HARQ-ACKs with different priorities. Further, in Option 1-3-3, for example, even when the Separate coding is applied, the number of bits for the high-priority HARQ-ACK is relatively small (e.g., 4 to 13 bits), and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 1-3-3, thus suppressing an increase in the amount of implementation processing for terminal 200.

[Case 2-1]

Case 2-1 is when the number of bits for the high-priority HARQ-ACK is more than 2 bits and up to 11 bits and the number of bits for the low-priority HARQ-ACK is up to 2 bits.

In Case 2-1, a PUCCH format for the high-priority HARQ-ACK before the multiplexing is PUCCH format 2, 3, or 4. By contrast, a PUCCH format for the low-priority HARQ-ACK before the multiplexing is PUCCH format 0 or PUCCH format 1.

The number of HARQ-ACK bits after the multiplexing is 4 to 13 bits. Therefore, in Case 2-1, PUCCH format 2, 3, or 4 may be configured as the PUCCH format used for multiplexing of HARQ-ACKs.

Besides, in Case 2-1, there is scope for further study on an encoding method and a resource mapping method. Hereinafter, Option 2-1-1, Option 2-1-2, and Option 2-1-3 will be described as exemplary UCI transmission methods in Case 2-1.

<Option 2-1-1>

Terminal 200 may, for example, perform the Joint coding on the high-priority HARQ-ACK and the low-priority HARQ-ACK and then multiplex and transmit them by using PUCCH format 2, 3 or 4.

Further, in a case where the total number of bits for the high-priority HARQ-ACK and the low-priority HARQ-ACK is up to 11 bits, terminal 200 may perform the Joint coding on the HARQ-ACK after the multiplexing by using the block code (RM code), for example. On the other hand, when the total number of bits is more than 11 bits, terminal 200 may perform the Joint coding on the HARQ-ACK after the multiplexing by using the Polar code, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 2-1-1 are similar to the methods in the multiplexing of HARQ-ACKs having the same priority in NR Rel. 15/16, for example, which is thus advantageous in simplicity in implementation for terminal 200.

<Option 2-1-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the block code (e.g., RM code) and then map the encoded UCI bits to the PUCCH resource. The resource amount to be allocated to the high-priority HARQ-ACK in PUCCH (e.g., the number of REs) may be determined according to, for example, the following Equation 3.

[3]

$$Q'_{ACK}=[O\_ACK/(\text{coderate*Modulation order})]$$     (Equation 3)

In Equation 3, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Further, terminal 200 may, for example, encode the low-priority HARQ-ACK by the Repetition code and map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of a "UCI bit" and "UL-SCH" in PUSCH in NR Rel. 15/16, for example (see, e.g., NPL 2 or 3). By way of example, the "UCI bit" of the mapping method in NR Rel. 15/16 may be applied by replacing with the "high-priority HARQ-ACK," and "UL-SCH" of the mapping method in NR Rel. 15/16 may be applied by replacing with the "low-priority HARQ-ACK." For example, in the PUCCH resource, the high-priority HARQ-ACK may be mapped to an RE that is different from the RE to which an RS is mapped according to the Frequency-first-time-second format or may be mapped to a symbol closer to an RS symbol. Further, for example, in the PUCCH resource, the low-priority HARQ-ACK may be mapped to an RE that is different from the RE to which the RS and the high-priority HARQ-ACK are mapped.

The encoding method in Option 2-1-2 allows configuration of an appropriate coding rate or resource allocation for each of the HARQ-ACKs with different priorities. Further, in Option 2-1-2, for example, even when the Separate coding is applied, the number of bits for each of the high-priority HARQ-ACK and the low-priority HARQ-ACK is relatively small (e.g., 4 to 13 bits), and the CRC is not easily to be added thereto; hence, an increase in overhead due to the CRC is unlikely to occur.

<Option 2-1-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the block code (e.g., RM code) and then map the encoded UCI bits to the PUCCH resource. Further, terminal 200 may, for example, encode the low-priority HARQ-ACK by the Repetition code and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 2-1-3 allows configuration of an appropriate coding rate or resource allocation for each of the HARQ-ACKs with different priorities. Further, in Option 2-1-3, for example, even when the Separate coding is applied, the number of bits for each of the high-priority HARQ-ACK and the low-priority HARQ-ACK is relatively small (e.g., 4 to 13 bits), and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 2-1-3, thus suppressing an increase in the amount of implementation processing for terminal 200.

[Case 2-2]

Case 2-2 is when the number of bits for the high-priority HARQ-ACK is more than 2 bits and up to 11 bits and the number of bits for the low-priority HARQ-ACK is more than 2 bits and up to 11 bits.

In Case 2-2, a PUCCH format for the high-priority HARQ-ACK and the low-priority HARQ-ACK before the multiplexing is PUCCH format 2, 3, or 4.

The number of HARQ-ACK bits after the multiplexing is 6 to 22 bits. Therefore, in Case 2-2, PUCCH format 2, 3, or 4 may be configured as the PUCCH format used for multiplexing of HARQ-ACKs.

Besides, in Case 2-2, there is scope for further study on an encoding method and a resource mapping method. Hereinafter, Option 2-2-1, Option 2-2-2, and Option 2-2-3 will be described as exemplary UCI transmission methods in Case 2-2.

<Option 2-2-1>

Terminal 200 may, for example, perform the Joint coding on the high-priority HARQ-ACK and the low-priority HARQ-ACK and then multiplex and transmit them by using PUCCH format 2, 3 or 4.

Further, in a case where the total number of bits for the high-priority HARQ-ACK and the low-priority HARQ- ACK is up to 11 bits, terminal 200 may perform the Joint coding on the HARQ-ACK after the multiplexing by using the block code (RM code), for example. On the other hand, when the total number of bits is more than 11 bits, terminal 200 may perform the Joint coding on the HARQ-ACK after the multiplexing by using the Polar code, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 2-2-1 are similar to the methods in the multiplexing of HARQ-ACKs having the same priority in NR Rel. 15/16, for example, which is thus advantageous in simplicity in implementation for terminal 200.

<Option 2-2-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the block code (e.g., RM code) and then map the encoded UCI bits to the PUCCH resource. The resource amount to be allocated to the high-priority HARQ-ACK in PUCCH (e.g., the number of REs) may be determined according to, for example, the following Equation 4.

[4]

$$Q'_{ACK} = \left\lceil \frac{O_{ACK}}{\text{coderate} * \text{Modulation order}} \right\rceil \qquad \text{(Equation 4)}$$

In Equation 4, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Further, terminal 200 may, for example, encode the low-priority HARQ-ACK by the block code (e.g., RM code) and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of a "UCI bit" and "UL-SCH" in PUSCH in NR Rel. 15/16, for example (see, e.g., NPL 2 or 3). By way of example, the "UCI bit" of the mapping method in NR Rel. 15/16 may be applied by replacing with the "high-priority HARQ-ACK," and "UL-SCH" of the mapping method in NR Rel. 15/16 may be applied by replacing with the "low-priority HARQ-ACK." For example, in the PUCCH resource, the high-priority HARQ-ACK may be mapped to an RE that is different from the RE to which an RS is mapped according to the Frequency-first-time-second format or may be mapped to a symbol closer to an RS symbol. Further, for example, in the PUCCH resource, the low-priority HARQ-ACK may be mapped to an RE that is different from the RE to which the RS and the high-priority HARQ-ACK are mapped.

The encoding method in Option 2-2-2 allows configuration of an appropriate coding rate or resource allocation for each of the HARQ-ACKs with different priorities. Further, in Option 2-2-2, for example, even when the Separate coding is applied, the number of bits for each of the high-priority HARQ-ACK and the low-priority HARQ-ACK is relatively small (e.g., 6 to 22 bits), and the CRC is not easily to be added thereto; hence, an increase in overhead due to the CRC is unlikely to occur.

<Option 2-2-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the block code (e.g., RM code) and then map the encoded UCI bits to the PUCCH resource. Further, terminal 200 may, for example, encode the low-priority HARQ-ACK by the block code (e.g., RM code) and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 2-2-3 allows configuration of an appropriate coding rate or resource allocation for each of the HARQ-ACKs with different priorities. Further, in Option 2-2-3, for example, even when the Separate coding is applied, the number of bits for each of the high-priority HARQ-ACK and the low-priority HARQ-ACK is relatively small (e.g., 6 to 22 bits), and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 2-2-3, thus suppressing an increase in the amount of implementation processing for terminal 200.

[Case 2-3]

Case 2-3 is when the number of bits for the high-priority HARQ-ACK is more than 2 bits and up to 11 bits and the number of bits for the low-priority HARQ-ACK is more than 11 bits.

In Case 2-3, a PUCCH format for the high-priority HARQ-ACK and the low-priority HARQ-ACK before the multiplexing is PUCCH format 2, 3, or 4.

The number of HARQ-ACK bits after the multiplexing is more than 14 bits.

Therefore, in Case 2-3, PUCCH format 2, 3, or 4 may be configured as the PUCCH format used for multiplexing of HARQ-ACKs.

Besides, in Case 2-3, there is scope for further study on an encoding method and a resource mapping method. Hereinafter, Option 2-3-1, Option 2-3-2, and Option 2-3-3 will be described as exemplary UCI transmission methods in Case 2-3.

<Option 2-3-1>

Terminal 200 may, for example, perform the Joint coding on the high-priority HARQ-ACK and the low-priority HARQ-ACK and then multiplex and transmit them by using PUCCH format 2, 3 or 4.

Additionally, terminal 200 may perform the Joint coding, by the Polar code, on the HARQ-ACK after the multiplexing, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 2-3-1 are similar to the methods in the multiplexing of HARQ-ACKs having the same priority in NR Rel. 15/16, for example, which is thus advantageous in simplicity in implementation for terminal 200.

<Option 2-3-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the block code (e.g., RM code) and then map the encoded UCI bits to the PUCCH resource. The resource amount to be allocated to the high-priority HARQ-ACK in PUCCH (e.g., the number of REs) may be determined according to, for example, the following Equation 5.

[5]

$$Q'_{ACK} = \left\lceil \frac{O_{ACK}}{\text{coderate} * \text{Modulation order}} \right\rceil \qquad \text{(Equation 5)}$$

In Equation 5, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Further, terminal 200 may, for example, encode the low-priority HARQ-ACK by the Polar code and map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of a "UCI bit" and "UL-SCH" in PUSCH in NR Rel. 15/16, for example (see, e.g., NPL 2 or 3). By way of example, the "UCI bit" of the mapping method in NR Rel. 15/16 may be applied by replacing with the "high-priority HARQ-ACK," and "UL-SCH" of the mapping method in NR Rel. 15/16 may be applied by replacing with the "low-priority HARQ-ACK." For example, in the PUCCH resource, the high-priority HARQ-ACK may be mapped to an RE that is different from the RE to which an RS is mapped according to the Frequency-first-time-second format or may be mapped to a symbol closer to an RS symbol. Further, for example, in the PUCCH resource, the low-priority HARQ-ACK may be mapped to an RE that is different from the RE to which the RS and the high-priority HARQ-ACK are mapped.

The encoding method in Option 2-3-2 allows configuration of an appropriate coding rate or resource allocation for each of the HARQ-ACKs with different priorities. Further, in Option 2-3-2, for example, even when the Separate coding is applied, the number of bits for the high-priority HARQ-ACK is relatively small, and the CRC is not easily to be added thereto; hence, an increase in overhead due to the CRC is unlikely to occur.

<Option 2-3-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the block code (e.g., RM code) and then map the encoded UCI bits to the PUCCH resource. Further, terminal 200 may, for example, encode the low-priority HARQ-ACK by the Polar code and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 2-3-3 allows configuration of an appropriate coding rate or resource allocation for each of the HARQ-ACKs with different priorities. Further, in Option 2-3-3, for example, even when the Separate coding is applied, the number of bits for the high-priority HARQ-ACK is relatively small, and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 2-3-3, thus suppressing an increase in the amount of implementation processing for terminal 200.

[Case 3-1]

Case 3-1 is when the number of bits for the high-priority HARQ-ACK is more than 11 bits and the number of bits for the low-priority HARQ-ACK is up to 2 bits.

In Case 3-1, a PUCCH format for the high-priority HARQ-ACK before the multiplexing is PUCCH format 2, 3, or 4. By contrast, a PUCCH format for the low-priority HARQ-ACK before the multiplexing is PUCCH format 0 or PUCCH format 1.

The number of HARQ-ACK bits after the multiplexing is more than 12 bits. Therefore, in Case 2-1, PUCCH format 2, 3, or 4 may be configured as the PUCCH format used for multiplexing HARQ-ACKs.

Besides, in Case 3-1, there is scope for further study on an encoding method and a resource mapping method. Hereinafter, Option 3-1-1, Option 3-1-2, and Option 3-1-3 will be described as exemplary UCI transmission methods in Case 3-1.

<Option 3-1-1>

Terminal 200 may, for example, perform the Joint coding on the high-priority HARQ-ACK and the low-priority HARQ-ACK and then multiplex and transmit them by using PUCCH format 2, 3 or 4.

Additionally, terminal 200 may perform the Joint coding, by the Polar code, on the HARQ-ACK after the multiplexing, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 3-1-1 are similar to the methods in the multiplexing of HARQ-ACKs having the same priority in NR Rel. 15/16, for example, which is thus advantageous in simplicity in implementation for terminal 200.

<Option 3-1-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Polar and then map the encoded UCI bits to the PUCCH resource. The resource amount to be allocated to the high-priority HARQ-ACK in PUCCH (e.g., the number of REs) may be determined according to, for example, the following Equation 6.

[6]

$$Q'_{ACK}=\lceil (O_{ACK}+L_{ACK})/(\text{coderate}*\text{Modulation order})\rceil \quad \text{(Equation 6)}$$

In Equation 6, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Further, terminal 200 may, for example, encode the low-priority HARQ-ACK by the Repetition code and map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of a "UCI bit" and "UL-SCH" in PUSCH in NR Rel. 15/16, for example (see, e.g., NPL 2 or 3). By way of example, the "UCI bit" of the mapping method in NR Rel. 15/16 may be applied by replacing with the "high-priority HARQ-ACK," and "UL-SCH" of the mapping method in NR Rel. 15/16 may be applied by replacing with the "low-priority HARQ-ACK." For example, in the PUCCH resource, the high-priority HARQ-ACK may be mapped to an RE that is different from the RE to which an RS is mapped according to the Frequency-first-time-second format or may be mapped to a symbol closer to an RS symbol. Further, for example, in the PUCCH resource, the low-priority HARQ-ACK may be mapped to an RE that is different from the RE to which the RS and the high-priority HARQ-ACK are mapped.

The encoding method in Option 3-1-2 allows configuration of an appropriate coding rate or resource allocation for each of the HARQ-ACKs with different priorities. Further, in Option 3-1-2, for example, even when the Separate coding is applied, the number of bits for the low-priority HARQ-ACK is relatively small, and the CRC is not easily to be added thereto; hence, an increase in overhead due to the CRC is unlikely to occur.

<Option 3-1-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Polar code and then map the encoded UCI bits to the PUCCH resource. Further, terminal 200 may, for example, encode the low-priority HARQ-ACK by the Repetition code and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 3-1-3 allows configuration of an appropriate coding rate or resource allocation for each of the HARQ-ACKs with different priorities. Further, in Option 3-1-3, for example, even when the Separate coding is applied, the number of bits for the low-priority HARQ-ACK is relatively small, and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 3-1-3, thus suppressing an increase in the amount of implementation processing for terminal 200.

[Case 3-2]

Case 3-2 is when the number of bits for the high-priority HARQ-ACK is more than 11 bits and the number of bits for the low-priority HARQ-ACK is more than 2 bits and up to 11 bits.

In Case 3-2, a PUCCH format for the high-priority HARQ-ACK and the low-priority HARQ-ACK before the multiplexing is PUCCH format 2, 3, or 4.

The number of HARQ-ACK bits after the multiplexing is more than 14 bits. Therefore, in Case 3-2, PUCCH format 2, 3, or 4 may be configured as the PUCCH format used for multiplexing of HARQ-ACKs.

Besides, in Case 3-2, there is scope for further study on an encoding method and a resource mapping method. Hereinafter, Option 3-2-1, Option 3-2-2, and Option 3-2-3 will be described as exemplary UCI transmission methods in Case 3-2.

<Option 3-2-1>

Terminal 200 may, for example, perform the Joint coding on the high-priority HARQ-ACK and the low-priority HARQ-ACK and then multiplex and transmit them by using PUCCH format 2, 3 or 4.

Additionally, terminal 200 may perform the Joint coding, by the Polar code, on the HARQ-ACK after the multiplexing, for example.

As a PUCCH resource for multiplexing of a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 3-2-1 are similar to the methods in the multiplexing of HARQ-ACKs having the same priority in NR Rel. 15/16, for example, which is thus advantageous in simplicity in implementation for terminal 200.

<Option 3-2-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Polar and then map the encoded UCI bits to the PUCCH resource. The resource amount to be allocated to the high-priority HARQ-ACK in PUCCH (e.g., the number of REs) may be determined according to, for example, the following Equation 7.

[7]

$$Q'_{ACK}=[(O_{ACK}+L_{ACK})/(\text{coderate}*\text{Modulation order})] \quad \text{(Equation 7)}$$

In Equation 7, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Further, terminal 200 may, for example, encode the low-priority HARQ-ACK by the block code (e.g., RM code) and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of a "UCI bit" and "UL-SCH" in PUSCH in NR Rel. 15/16, for example (see, e.g., NPL 2 or 3). By way of example, the "UCI bit" of the mapping method in NR Rel. 15/16 may be applied by replacing with the "high-priority HARQ-ACK," and "UL-SCH" of the mapping method in NR Rel. 15/16 may be applied by replacing with the "low-priority HARQ-ACK." For example, in the PUCCH resource, the high-priority HARQ-ACK may be mapped to an RE that is different from the RE to which an RS is mapped according to the Frequency-first-time-second format or may be mapped to a symbol closer to an RS symbol. Further, for example, in the PUCCH resource, the low-priority HARQ-ACK may be mapped to an RE that is different from the RE to which the RS and the high-priority HARQ-ACK are mapped.

The encoding method in Option 3-2-2 allows configuration of an appropriate coding rate or resource allocation for each of the HARQ-ACKs with different priorities. Further, in Option 3-2-2, for example, even when the Separate coding is applied, the number of bits for the low-priority HARQ-ACK is relatively small, and the CRC is not easily to be added thereto; hence, an increase in overhead due to the CRC is unlikely to occur.

<Option 3-2-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Polar code and then map the encoded UCI bits to the PUCCH resource. Further, terminal 200 may, for example, encode the low-priority HARQ-ACK by the block code (e.g., RM code) and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 3-2-3 allows configuration of an appropriate coding rate or resource allocation for each of the HARQ-ACKs with different priorities. Further, in Option 3-2-3, for example, even when the Separate coding is applied, the number of bits for the low-priority HARQ-ACK is relatively small, and the CRC is not easily to be added thereto; hence, an increase in overhead due to the CRC is unlikely to occur.

In addition, the resource mapping method to PUCCH (e.g., HARQ-ACK and CSI) in NR Rel. 15/16 can be repurposed for a resource mapping in Option 3-2-3, thus suppressing an increase in the amount of implementation processing for terminal 200.

[Case 3-3]

Case 3-3 is when the number of bits for the high-priority HARQ-ACK is more than 11 bits and the number of bits for the low-priority HARQ-ACK is more than 11 bits.

In Case 3-3, a PUCCH format for the high-priority HARQ-ACK and the low-priority HARQ-ACK before the multiplexing is PUCCH format 2, 3, or 4.

The number of HARQ-ACK bits after the multiplexing is more than 23 bits. Therefore, in Case 3-3, PUCCH format 2, 3, or 4 may be configured as the PUCCH format used for multiplexing of HARQ-ACKs.

Besides, in Case 3-3, there is scope for further study on an encoding method and a resource mapping method. Hereinafter, Option 3-3-1, Option 3-3-2, and Option 3-3-3 will be described as exemplary UCI transmission methods in Case 3-3.

<Option 3-3-1>

Terminal 200 may, for example, perform the Joint coding on the high-priority HARQ-ACK and the low-priority HARQ-ACK and then multiplex and transmit them by using PUCCH format 2, 3, or 4.

Additionally, terminal 200 may perform the Joint coding, by the Polar code, on the HARQ-ACK after the multiplexing, for example.

As a PUCCH resource for multiplexing a plurality of HARQ-ACKs, the PUCCH resource (or PUCCH resource set) for the high-priority HARQ-ACK may be used, for example. Incidentally, a resource mapping method for HARQ-ACK bits to the PUCCH resource may be similar to the operation in NR Rel. 15/16, for example (see, e.g., NPL 2 or 3).

The encoding method and the resource mapping in Option 3-3-1 are similar to the methods in the multiplexing of HARQ-ACKs having the same priority in NR Rel. 15/16, for example, which is thus advantageous in simplicity in implementation for terminal 200.

<Option 3-3-2>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Polar code and then map the encoded UCI bits to the PUCCH resource. The resource amount to be allocated to the high-priority HARQ-ACK in PUCCH (e.g., the number of REs) may be determined according to, for example, the following Equation 8.

[8]

$$Q'_{ACK} = \lceil (O_{ACK} + L_{ACK})/(\text{coderate} \cdot \text{Modulation order}) \rceil \quad \text{(Equation 8)}$$

In Equation 8, $O_{ACK}$ indicates the number of high-priority HARQ-ACK bits, coderate indicates a coding rate to be configured for the high-priority HARQ-ACK, and Modulation order indicates a modulation order of PUCCH format 2, 3, or 4.

Further, terminal 200 may, for example, encode the low-priority HARQ-ACK by the Polar code and map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of a "UCI bit" and "UL-SCH" in PUSCH in NR Rel. 15/16, for example (see, e.g., NPL 2 or 3). By way of example, the "UCI bit" of the mapping method in NR Rel. 15/16 may be applied by replacing with the "high-priority HARQ-ACK," and "UL-SCH" of the mapping method in NR Rel. 15/16 may be applied by replacing with the "low-priority HARQ-ACK." For example, in the PUCCH resource, the high-priority HARQ-ACK may be mapped to an RE that is different from the RE to which an RS is mapped according to the Frequency-first-time-second format or may be mapped to a symbol closer to an RS symbol. Further, for example, in the PUCCH resource, the low-priority HARQ-ACK may be mapped to an RE that is different from the RE to which the RS and the high-priority HARQ-ACK are mapped.

The encoding method in Option 3-3-2 allows configuration of an appropriate coding rate or resource allocation for each of the HARQ-ACKs with different priorities.

<Option 3-3-3>

Terminal 200 may, for example, independently encode the high-priority HARQ-ACK and the low-priority HARQ-ACK (e.g., Separate coding) and then multiplex and transmit them by using PUCCH format 2, 3, or 4.

Additionally, terminal 200 may, for example, encode the high-priority HARQ-ACK by the Polar code and then map the encoded UCI bits to the PUCCH resource. Further, terminal 200 may, for example, encode the low-priority HARQ-ACK, by the Polar code, and then map the encoded UCI bits to the PUCCH resource.

As for mapping of the high-priority HARQ-ACK and the low-priority HARQ-ACK to the PUCCH resource of PUCCH format 2, 3, or 4, a method may be applied which is similar to the mapping relation of an "HARQ-ACK bit," "CSI Part 1," and "CSI part 2" in NR Rel. 15/16, for example (see, e.g., NPL 2 or 3). By way of example, the "HARQ-ACK bit" and "CSI Part 1" of the mapping method in NR Rel. 15/16 may be applied by replacing with the "high-priority HARQ-ACK," and "CSI part 2" of the mapping method in NR Rel. 15/16 may be applied by replacing with the "low-priority HARQ-ACK." For example, in the PUCCH resource, a modulation symbol string obtained by modulating the high-priority HARQ-ACK may be mapped to an RE that is different from the RE to which an RS is mapped according to the Frequency-first-time-second format, and the high-priority HARQ-ACK bit may be mapped to a symbol closer to an RS symbol. Further, for example, in the PUCCH resource, the low-priority HARQ-ACK may be mapped to an RE that is different from the RE to which the RS and the high-priority HARQ-ACK are mapped. In other words, in the mapping to REs, the high-priority HARQ-ACK bit may be mapped first, followed by the low-priority HARQ-ACK bit to the rest of the PUCCH resource.

The encoding method in Option 3-3-3 allows configuration of an appropriate coding rate or resource allocation for each of the HARQ-ACKs with different priorities.

In addition, the resource mapping method to PUCCH (e.g., HARQ-ACK and CSI) in NR Rel. 15/16 can be repurposed for a resource mapping in Option 2-3-3, thus suppressing an increase in the amount of implementation processing for terminal 200.

The exemplary UCI transmission methods in the respective cases (Case 1-1 to Case 3-3) indicated in FIG. 5 have been each described, thus far.

Note that, in the above-mentioned examples, a case has been described where the PUCCH resource for the high-priority HARQ-ACK is used as a PUCCH resource for multiplexing of a plurality of HARQ-ACKs, but the present disclosure is not limited to this, and another resource may be used.

Next, an example of processing in terminal 200 will be described.

Figure 6:
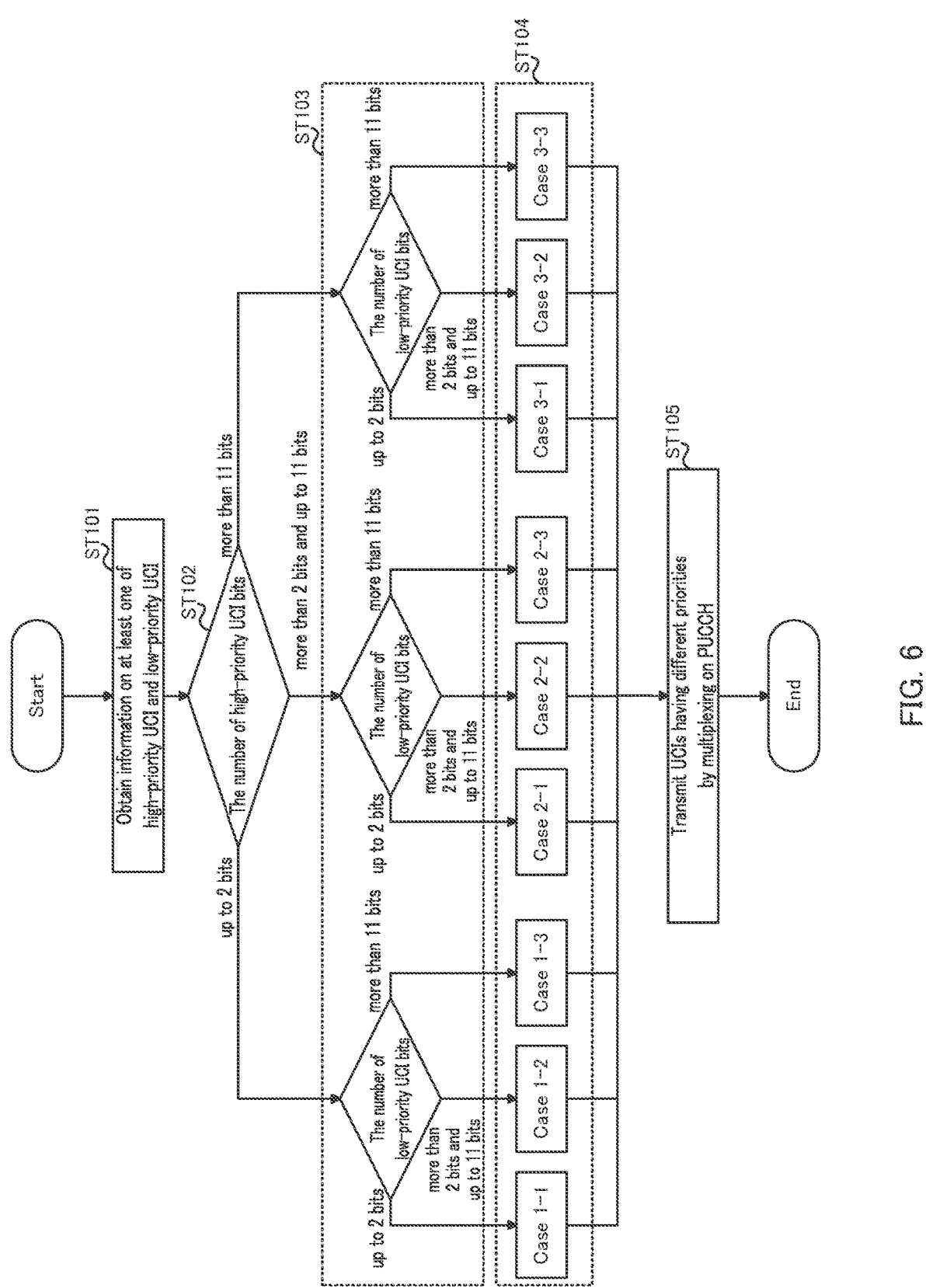
FIG. 6 is a flowchart illustrating an exemplary transmission operation in the terminal.

FIG. 6 is a flowchart illustrating an exemplary operation related to UCI transmission in terminal 200 in a case where transmission of a high-priority UCI (e.g., HARQ-ACK) and transmission of a low-priority UCI (e.g., HARQ-ACK) overlap in terms of time.

In FIG. 6, terminal 200 obtains information on at least one of the high-priority UCI and the low-priority UCI, for example (ST101). The information may include, for example, information on the number of UCI bits or a PUCCH resource (or PUCCH format) used for UCI transmission.

Terminal 200, for example, determines the number of bits for the high-priority UCI (ST102). By way of example, terminal 200 may determine into which of a plurality of groups in accordance with the number of UCI bits the number of bits (or payload size) of the high-priority UCI indicated in the information obtained in the processing of ST101 is classified. In one example, in the example of FIG. 6, terminal 200 may determine into which of the following groups the number of high-priority UCI bits falls: up to 2 bits; more than 2 bits and up to 11 bits; or more than 11 bits.

Terminal 200, for example, determines the number of bits for the low-priority UCI (ST103). By way of example, terminal 200 may determine into which of a plurality of groups in accordance with the number of UCI bits the number of bits (or payload size) of the low-priority UCI indicated in the information obtained in the processing of ST101 is classified. In one example, in the example of FIG. 6, terminal 200 may determine into which of the following groups the number of low-priority UCI bits falls: up to 2 bits; more than 2 bits and up to 11 bits; or more than 11 bits.

Terminal 200 identifies, based on the determination results in ST102 and ST103, a combination of the number of bits for the high-priority UCI and the low-priority UCI (e.g., any of Case 1-1 to Case 3-3 indicated in FIG. 5) (ST104). The method of identifying the Case is not limited to the method illustrated in FIG. 6, and terminal 200 may, for example, identify the Case by determining the number of bits for the low-priority UCI and then determining the number of bits for the high-priority UCI, or may identify the Case based on a combination of the number of bits for both the high-priority UCI and the low-priority UCI.

Terminal 200 transmits UCIs having different priorities by multiplexing them on PUCCH, based on the identified Case (ST105). For example, terminal 200 may determine at least one of a UCI encoding method (e.g., Joint coding or Separate coding), a UCI mapping method to PUCCH, and a PUCCH format after the multiplexing, which correspond to the identified Case.

The exemplary operation of terminal 200 has been described thus far.

As mentioned above, each Case has one or more applicable Options. In the present embodiment, for example, terminal 200 may be operated based on a combination of the Options for each Case.

By way of example, the combination of the Options for each Case may be as the following: Option 1-1-1; Option 1-2-2; Option 1-3-2; Option 2-1-2; Option 2-2-2; Option 2-3-2; Option 3-1-2; Option 3-2-2; and Option 3-3-1. In this combination, terminal 200 applies the Joint coding when the number of bits for both the high-priority HARQ-ACK and the low-priority HARQ-ACK is up to 2 bits or when the number of bits for both the high-priority HARQ-ACK and the low-priority HARQ-ACK is more than 11 bits (e.g., Case 1-1-1 and Case 3-3-1), whereas the terminal applies the Separate coding in other cases (e.g., Option 1-2-2, Option 1-3-2, Option 2-1-2, Option 2-2-2, Option 2-3-2, Option 3-1-2, and Option 3-2-2). In this combination, for example, when the number of HARQ-ACK bits is small (e.g., up to 2 bits) and an impact on the resource-utilization efficiency is also small, terminal 200 can apply the Joint coding or PUCCH format 0 or PUCCH format 1 suitable for transmission of 1 or 2 bits. Meanwhile, in this combination, when the number of HARQ-ACK bits is large (e.g., more than 11 bits), terminal 200 can suppress an increase in the number of times of encoding (e.g., the number of times of Polar encoding) by, e.g., applying a single encoding by the Joint coding.

Further, for example, in the above-mentioned exemplary combination, Option 1-1-2 may be used instead of Option 1-1-1. In this case, terminal 200 can use PUCCH format 0 even when the total number of bits for the high-priority HARQ-ACK and the low-priority HARQ-ACK is three bits, for example.

Further, for example, in the above-mentioned exemplary combination, Option 2-3-3 may be used instead of Option 2-3-2. In this case, for example, terminal 200 can apply, to the low-priority HARQ-ACK, a method similar to the encoding and the resource mapping for CSI Part 2 in Rel. 15/16, thereby suppressing an increase in the amount of implementation processing for terminal 200.

Alternatively, as another example, the combination of the Options for each Case may be as the following: Option 1-1-1; Option 1-2-1; Option 1-3-1; Option 2-1-1; Option 2-2-2; Option 2-3-2 or 2-3-3; Option 3-1-1; Option 3-2-2 (or Option 3-2-3); and Option 3-3-2 (or Option 3-3-3). In this combination, terminal 200, for example, applies the Joint coding when the number of bits for either the high-priority HARQ-ACK or the low-priority HARQ-ACK is up to two bits, regardless of the total number of bits for the high-priority HARQ-ACK and the low-priority HARQ-ACK. This exemplary combination enables terminal 200 to improve the transmission efficiency because the terminal need not use a Repetition code which is not optimized for the transmission of one or two bits.

Note that the combination of the Options for each Case is not limited to the above-mentioned examples and may be another combination. In one example, at least one of an encoding method for an HARQ-ACK (e.g., Joint coding or Separate coding), a mapping method for an HARQ-ACK to PUCCH, and a PUCCH format after the multiplexing may be controlled in accordance with one or a plurality of the following elements: the number of low-priority HARQ-ACK bits; the number of high-priority HARQ-ACK bits; the total number of bits; a PUCCH format; and limitation of the number of times of encoding.

Thus, according to the present embodiment, terminal 200 determines a parameter used for transmission (e.g., multiplexing transmission) of a plurality of UCIs having different priorities, in accordance with information on a size (e.g., the number of bits) of at least one of the plurality of UCIs. With this control, terminal 200 can appropriately configure an encoding method, a PUCCH format, or a resource mapping method in the multiplexing of UCIs, based on the number of bits for each UCI to be multiplexed or the total number of bits for the multiplexed UCIs, for example. Therefore, according to the present embodiment, the UCI transmission efficiency (e.g., resource-utilization efficiency, transmission quality, or simplicity in implementation for terminal 200) can be improved even when the UCI transmissions having different priorities overlap in terms of time.

Variation of Embodiment 1

For example, a scenario is assumed in which the number of HARQ-ACK bits for an URLLC transmission which is configured with a high priority is set to a smaller number of bits from the viewpoint of low latency or high reliability. Hence, the situation is unlikely to occur where transmission of a high-priority HARQ-ACK with a larger number of bits (e.g., value larger than threshold X to be described later) and transmission of a low-priority HARQ-ACK overlap in terms of time.

Accordingly, for example, in Embodiment 1, the case of multiplexing of HARQ-ACKs having different priorities on PUCCH may be applied when the number of bits for the high-priority HARQ-ACK is equal to or less than the bits of threshold X. For example, when the number of bits for the high-priority HARQ-ACK is larger than the bits of threshold X, terminal 200 may apply the operation in NR Rel. 16, and thereby drop the low-priority HARQ-ACK and transmit the high-priority HARQ-ACK.

According to this variation, the implementation for terminal 200 can be further simplified.

For example, in a case where the bits of threshold X is two bits (where X=2), terminal 200 may control the UCI multiplexing based on a combination of Options for each Case, in Case 1-1, Case 1-2, and Case 1-3 mentioned above (e.g., where high-priority HARQ-ACK is up to two bits). On the other hand, in a case corresponding to Cases different from and other than the above Cases (i.e., where high-priority HARQ-ACK is more than two bits), terminal 200 may drop the low-priority HARQ-ACK and transmit the high-priority HARQ-ACK.

Further, for example, in a case where the bits of threshold X is 11 bits (where X=11), terminal 200 may control the UCI multiplexing based on a combination of Options for each Case, in Case 1-1, Case 1-2, Case 1-3, Case 2-1, Case 2-2, and Case 2-3 mentioned above (i.e., where high-priority HARQ-ACK is up to 11 bits). On the other hand, in a case corresponding to Cases different from and other than the above Cases (i.e., where high-priority HARQ-ACK is more than 11 bits), terminal 200 may drop the low-priority HARQ-ACK and transmit the high-priority HARQ-ACK.

Incidentally, threshold X is not limited to 2 bits or 11 bits, and may be another value.

Embodiment 2

In the present embodiment, as an example, a case will be described where an SR corresponding to a service which is configured with a high priority (hereinafter, referred to as "high-priority SR") and an HARQ-ACK corresponding to a service which is configured with a low priority (low-priority HARQ-ACK) are multiplexed on the same PUCCH.

The SR is one-bit information. Hence, as indicated in FIG. 7, the case classification in accordance with the number of bits for the low-priority HARQ-ACK will be described. In the example indicated in FIG. 7, the low-priority HARQ-ACK is classified into the cases in which the number of bits (e.g., HARQ-ACK payload size) is up to 2 bits (Case 1-1'), the number of bits is more than 2 bits and up to 11 bits (Case 1-2'), and the number of bits is more than 11 bits (Case 1-3').

In FIG. 7, HARQ-ACK bundling may be applied to the low-priority HARQ-ACK. When the HARQ-ACK bundling is applied, the number of bits for the low-priority HARQ-ACK may be the number of bits before the HARQ-ACK bundling or the number of bits after the HARQ-ACK bundling.

In the following, descriptions will be given of UCI transmission methods in the respective cases (Case 1-1', Case 1-2', and Case 1-3') indicated in FIG. 7.

[Case 1-1']

Case 1-1' is when the number of bits foe the low-priority HARQ-ACK is up to two bits.

In Case 1-1', a PUCCH format for the SR and the HARQ-ACK before multiplexing is PUCCH format 0 or PUCCH format 1.

When a PUCCH resource for the low-priority HARQ-ACK overlaps in terms of time with a PUCCH resource configured for transmission of the high-priority SR in a situation where PUCCH format 0 is used for transmission of the low-priority HARQ-ACK, terminal 200 may transmit the low-priority HARQ-ACK and the high-priority SR by multiplexing them on the PUCCH resource. The PUCCH resource may be determined based on, for example, a PUCCH resource allocated to transmit the low-priority HARQ-ACK. This multiplexing method is advantageous in simplicity in implementation for terminal 200 because this method is similar to the method of multiplexing the SR and the HARQ-ACK having the same priority in NR Rel. 15/16, for example.

Meanwhile, for example, when a PUCCH resource configured for transmission of the low-priority HARQ-ACK overlaps in terms of time with a PUCCH resource configured for transmission of the high-priority SR in a situation where the PUCCH resource configured for the transmission of the high-priority SR is PUCCH format 0 and the PUCCH resource configured for the transmission of the low-priority HARQ-ACK is PUCCH format 1, terminal 200 may apply the following Option 1, Option 2, or Option 3.

<Option 1>

In Option 1, terminal 200 does not multiplex an SR and an HARQ-ACK having different priorities (i.e., not support multiplexing).

For example, in the multiplexing of the SR and the HARQ-ACK having the same priority in NR Rel. 15, the terminal drops transmission of the SR and transmits the HARQ-ACK by using the PUCCH assigned to the HARQ-ACK. In contrast, for example, in the multiplexing of the SR and the HARQ-ACK having different priorities in NR Rel. 16, the terminal drops transmission of the HARQ-ACK and transmits the SR by using the PUCCH assigned to the SR. From the operations in NR Rel. 15/16, the assumption can be also made that the multiplexing of the high-priority SR and the low-priority HARQ-ACK having different priorities need not be supported.

Option 1 is advantageous in simplicity in implementation for terminal 200 because of the similarity to the case of multiplexing of the SR and the HARQ-ACK having different priorities, in NR Rel. 16.

<Option 2>

In Option 2, terminal 200 varies, depending on the presence or absence of the high-priority SR (e.g., positive SR or negative SR), a cyclic shift sequence that is applied to a symbol overlapping in terms of time with a PUCCH resource for transmission of the high-priority SR, among symbols of PUCCH format 1 for transmission of the low-priority HARQ-ACK. This makes it possible for base station 100 to, for example, determine the presence or absence of the SR (e.g., positive SR or negative SR) based on the cyclic shift sequence that is applied to the symbol.

In such a manner, in Option 2, terminal 200 can transmit the high-priority SR by multiplexing it on the PUCCH for the low-priority HARQ-ACK without dropping the transmission of the low-priority HARQ-ACK. The method of Option 2 can be regarded as, for example, a type of the Joint coding between the high-priority SR and the low-priority HARQ-ACK.

<Option 3>

In Option 3, terminal 200 punctures a symbol overlapping in terms of time with a PUCCH resource for transmission of the high-priority SR, among symbols of PUCCH format 1 for transmission of the low-priority HARQ-ACK, and then perform transmission by multiplexing PUCCH format 0 for the high-priority SR on the PUCCH resource for the low-priority HARQ-ACK. The method of Option 3 can be regarded as, for example, a type of the Separate coding.

The descriptions have been each given of Option 1, Option 2, and Option 3 of a case where the transmission of the high-priority SR using PUCCH format 0 and the transmission of the low-priority HARQ-ACK using PUCCH format 1 overlap in terms of time.

Next, for example, when a PUCCH resource configured for transmission of the low-priority HARQ-ACK overlaps in terms of time with a PUCCH resource configured for transmission of the high-priority SR in a situation where the PUCCH resource configured for the transmission of the high-priority SR is PUCCH format 1 and the PUCCH resource configured for the transmission of the low-priority HARQ-ACK is PUCCH format 1, terminal 200 may apply the following Option 1 or Option 2.

<Option 1>

In Option 1, terminal 200, for example, transmits the low-priority HARQ-ACK and the high-priority SR by multiplexing on PUCCH.

For example, in the case of positive SR (or with SR), terminal 200 may transmit the low-priority HARQ-ACK by using the PUCCH assigned to the high-priority SR. On the other hand, for example, in the case of negative SR (or without SR), terminal 200 may transmit the low-priority HARQ-ACK by using the PUCCH assigned to the low-priority HARQ-ACK.

Base station 100 may, for example, determine the presence or absence of the high-priority SR (positive or negative) based on the PUCCH resource on which the low-priority HARQ-ACK has been actually transmitted. For example, when receiving the low-priority HARQ-ACK on the PUCCH resource for the high-priority SR, base station 100 may determine that the SR is positive, and when receiving the low-priority HARQ-ACK on the PUCCH resource for the low-priority HARQ-ACK, the base station may determine that the SR is negative.

Option 1 is advantageous in simplicity in implementation for terminal 200 because of the similarity to the method in the case of multiplexing of the SR and the HARQ-ACK having the same priority, in NR Rel. 15/16, for example.

<Option 2>

Option 1 is possibly not satisfy a latency requirement for the high-priority SR because the PUCCH resource for the low-priority HARQ-ACK may be used for the transmission of the high-priority SR. Hence, in Option 2, terminal 200 may multiplex a one-bit high-priority SR and a one-bit low-priority HARQ-ACK with each other by using the PUCCH resource allocated to the high-priority SR, for example.

In one example, terminal 200 may add a one-bit HARQ-ACK to the one bit indicating the presence or absence of an SR (e.g., tail of one bit), and then transmit the two-bit UCI bit string by using PUCCH format 1. For example, in a case where the number of bits for the low-priority HARQ-ACK is two bits, terminal 200 may perform compression into one bit by applying the HARQ-ACK bundling, and thus multiplex the compressed HARQ-ACK with the high-priority SR.

Option 2 enables terminal 200 to use, for transmitting the high-priority SR, the PUCCH resource allocated to the high-priority SR, which makes the high-priority SR transmission less susceptible to the PUCCH resource for the low-priority HARQ-ACK. As a result, according to Option 2, the latency requirement for the high-priority SR can be easily satisfied.

The descriptions have been each given of Option 1 and Option 2 of a case where the transmission of the high-priority SR using PUCCH format 1 and the transmission of the low-priority HARQ-ACK using PUCCH format 1 overlap in terms of time.

[Case 1-2']

Case 1-2' is when the number of bits for the low-priority HARQ-ACK is more than 2 bits and up to 11 bits.

In Case 1-2', a PUCCH format for the high-priority SR before the multiplexing is PUCCH format 0 or PUCCH format 1. By contrast, a PUCCH format for the low-priority HARQ-ACK before the multiplexing is PUCCH format 2, 3, or 4.

The total number of bits for the high-priority SR and the low-priority HARQ-ACK after the multiplexing is 4 to 13 bits. Therefore, in Case 1-2', PUCCH format 2, 3, or 4 may be configured as the PUCCH format for multiplexing of the SR and the HARQ-ACK.

Further, an encoding method and a resource mapping method in Case 1-2' can be realized by, for example, replacing the "high-priority HARQ-ACK" in Case 1-2 of Embodiment 1 with the "high-priority SR."

[Case 1-3']

Case 1-3' is when the number of bits for the low-priority HARQ-ACK is more than 11 bits.

In Case 1-3', a PUCCH format for the high-priority SR before the multiplexing is PUCCH format 0 or PUCCH format 1. By contrast, a PUCCH format for the low-priority HARQ-ACK before the multiplexing is PUCCH format 2, 3, or 4.

The total number of bits for the high-priority SR and the low-priority HARQ-ACK after the multiplexing is more than 12 bits. Therefore, in Case 1-3', PUCCH format 2, 3, or 4 may be configured as the PUCCH format for multiplexing of the SR and the HARQ-ACK.

Further, an encoding method and a resource mapping method in Case 1-3' can be realized by, for example, replacing the "high-priority HARQ-ACK" in Case 1-3 of Embodiment 1 with the "high-priority SR."

Thus, according to the present embodiment, even when the transmission of the high-priority SR and the transmission of the low-priority HARQ-ACK overlap in terms of time, terminal 200 can transmit the SR and the HARQ-ACK by multiplexing on PUCCH.

Embodiment 3

In the present embodiment, as an example, a description will be given of a case of multiplexing, on the same PUCCH, of a high-priority SR and a high-priority HARQ-ACK on one hand, and a low-priority HARQ-ACK on the other hand.

In the present embodiment, as the order of multiplexing of these three or more UCIs, terminal 200 may perform multiplexing processing between UCIs having the same priority first and then perform multiplexing processing between UCIs having different priorities.

For example, terminal 200 may apply, to the high-priority SR and the high-priority HARQ-ACK, the method of multiplexing the SR and the HARQ-ACK having the same priority in NR Rel. 15/16 (e.g., see NPL 2 or 3). Terminal 200 may then perform an operation in which the "high-priority HARQ-ACK" in Embodiment 1 mentioned above is replaced with "UCI after multiplexing of the high-priority SR and the high-priority HARQ-ACK." This allows the processing of multiplexing UCIs having different priorities, e.g., high-priority SR+HARQ-ACK and the low-priority HARQ-ACK.

According to the present embodiment, terminal 200 can apply the multiplexing operation similar to that in NR Rel.

15/16 to the multiplexing of UCIs having the same priority, whereas, to the multiplexing of UCIs having differing priorities, the terminal can apply, for example, the multiplexing method for HARQ-ACKs described in Embodiment 1, which is advantageous from the viewpoint of simplicity in implementation for terminal 200.

Embodiment 4

In the present embodiment, as in Embodiment 3, a description will be given of a case of multiplexing, on the same PUCCH, of a high-priority SR and a high-priority HARQ-ACK on one hand, and a low-priority HARQ-ACK on the other hand.

In the present embodiment, unlike in Embodiment 3, the multiplexing method for an SR and an HARQ-ACK having the same priority in NR Rel. 15/16 is not applied in the multiplexing of the high-priority SR and the high-priority HARQ-ACK.

By way of example, terminal 200 concatenates a high-priority SR bit and a high-priority HARQ-ACK bit. Terminal 200 may then perform an operation in which the "high-priority HARQ-ACK" in Embodiment 1 mentioned above is replaced with "UCI after concatenation of the high-priority SR and the high-priority HARQ-ACK." This allows the processing of multiplexing UCIs having different priorities, e.g., high-priority SR+HARQ-ACK and the low-priority HARQ-ACK.

Incidentally, in the present embodiment, a bit for the one-bit SR may be reserved with respect to a bit string of the high-priority HARQ-ACK, regardless of the presence or absence of the SR (e.g., positive SR or negative SR) and whether an SR resource and an HARQ-ACK resource overlap in terms of time.

For example, in Embodiment 3, when a PUCCH resource for the high-priority HARQ-ACK overlaps in terms of time with a PUCCH resource for transmission of the high-priority SR in a situation where the PUCCH resource configured for transmission of the high-priority SR is PUCCH format 0 and the high-priority HARQ-ACK is transmitted by using PUCCH format 1, transmission of the SR is dropped whereas the HARQ-ACK is transmitted by using the PUCCH assigned to the HARQ-ACK, in the multiplexing of the SR and the HARQ-ACK having the same priority in NR Rel. 15/16. Thus, in Embodiment 3, high-priority UCI and the low-priority HARQ-ACK are multiplexed after the high-priority SR being dropped.

Meanwhile, in the present embodiment, terminal 200 can multiplex the high-priority UCI and the low-priority HARQ-ACK while multiplexing the high-priority SR and the high-priority HARQ-ACK. In other words, in the present embodiment, terminal 200 need not drop the high-priority SR.

The embodiments according to an exemplary embodiment of the present disclosure have been described thus far.

OTHER EMBODIMENTS

1. In the above-mentioned embodiments, as illustrated in FIGS. 5 and 6, for example, description have been given of the operations of terminal 200 respectively corresponding to the plurality of Cases (combinations) in accordance with the number of bits for the high-priority UCI and the low-priority UCI, but terminal 200 may apply operations corresponding to some of the plurality of Cases illustrated in FIGS. 5 and 6 and may not apply the operations corresponding to the remaining Cases.

That is, an operation in which at least one Case is taken out from the plurality of Cases described in the above-mentioned embodiments may be applied. For example, as in the variation of Embodiment 1, among the nine Cases illustrated in FIGS. 5 and 6, terminal 200 may apply the operations corresponding to Case 1-1, Case 1-2, and Case 1-3 and need not apply the operations corresponding to the other Cases. Further, for example, among the nine Cases illustrated in FIGS. 5 and 6, terminal 200 may apply the operations corresponding to Case 1-1, Case 2-2, and Case 3-3 and need not apply the operations corresponding to the other Cases, for example. Note that Cases to be extracted from the plurality of Cases described in the above-mentioned embodiments are not limited to the above-mentioned examples and may be any Cases.

Similarly, in FIG. 7 of Embodiment 2, terminal 200 may apply, among the three cases of Case 1-1', Case 1-2', and Case 1-3', an operation corresponding to at least one Case and need not apply other operations.

2. In the above-mentioned embodiments, in FIG. 5, for example, a case has been described where terminal 200 controls the multiplexing of UCIs based on the number of bits for both the high-priority UCI and the low-priority UCI, but the present disclosure is not limited to this case. For example, terminal 200 may control the UCI multiplexing based on the number of bits for either the high-priority UCI or the low-priority UCI.

For example, in a situation where the control is executed based on the number of bits for the high-priority UCI, terminal 200 may apply the Joint Coding when the number of bits for the high-priority UCI is up to 2 bits, whereas the terminal may apply the Separate coding when the number of bits for the high-priority UCI is more than 2 bits. Alternatively, terminal 200 may apply the Joint Coding when the number of bits for the high-priority UCI is up to 11 bits, whereas the terminal may apply the Separate coding when the number of bits for the high-priority UCI is more than 11 bits. Incidentally, terminal 200 may execute, based on the number of bits for the high-priority UCI, not only the control of the encoding method such as the Joint coding and the Separate coding mentioned above but also control of another operation for the UCI multiplexing (e.g., determination of parameter corresponding to PUCCH format or resource mapping method).

Similarly, for example, in a situation where the control is executed based on the number of bits for the low-priority UCI, terminal 200 may apply the Joint Coding when the number of bits for the low-priority UCI is up to 2 bits, whereas the terminal may apply the Separate coding when the number of bits for the low-priority UCI is more than 2 bits. Alternatively, terminal 200 may apply the Joint Coding when the number of bits for the low-priority UCI is up to 11 bits, whereas the terminal may apply the Separate coding when the number of bits for the low-priority UCI is more than 11 bits. Incidentally, terminal 200 may execute, based on the number of bits for the low-priority UCI, not only the control of the encoding method such as the Joint coding and the Separate coding mentioned above but also control of another operation for the UCI multiplexing (e.g., determination of parameter corresponding to PUCCH format or resource mapping method).

3. In the above-mentioned embodiments, a case has been described where the number of UCI bits is classified into three ranges of cases in which up to 2 bits, more than 2 bits and up to 11 bits, and more than 11 bits, but the range into which the number of UCI bits is classified is not limited to three. I one example, the number of UCI bits may be classified into two ranges or may be classified into four or more ranges. Further, for example, the number of ranges of the classification may be different between the number of high-priority UCI bits and the number of the low-priority UCI bits.

Figure 8:
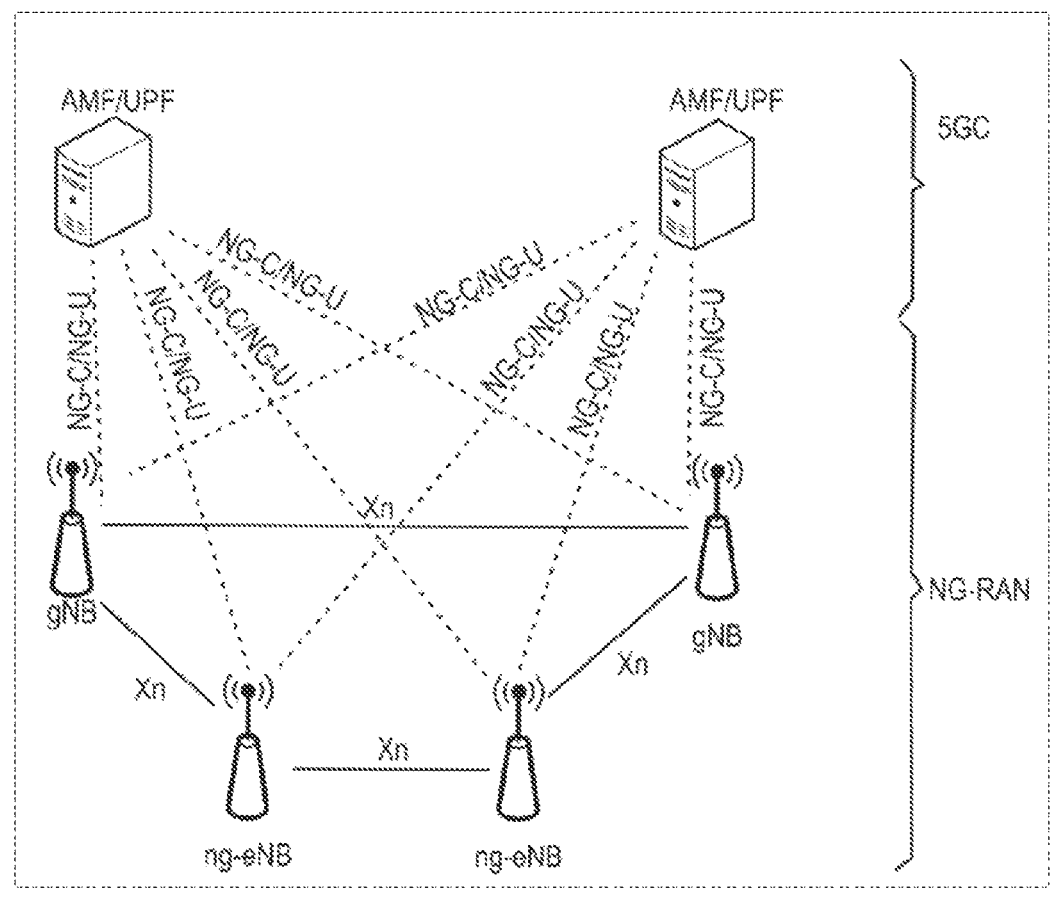
FIG. 8 illustrates an exemplary architecture of a 3GPP NR system.

Further, for example, as illustrated in FIG. 6 or FIG. 8, a case has been described where two thresholds of "2 bits" and "11 bits" are each configured as a threshold for classification of the number of UCI bits, but the threshold for classification of the number of UCI bits is not limited to the examples indicated in the above-mentioned embodiments and may be another value. The threshold for classification of the number of UCI bits may be different value between the high-priority UCI and the low-priority UCI. For example, the threshold may be configured based on the type of PUCCH format or encoding method.

4. In the above-mentioned embodiments, an example has been described where the high-priority UCI is an HARQ-ACK or an SR and the low-priority UCI is an HARQ-ACK, but the high-priority UCI and the low-priority UCI may be, for example, any of an HARQ-ACK, an SR, and a CSI. Further, another uplink signal or channel different from the UCI may be applied instead of at least one of the high-priority UCI and the low-priority UCI.

5. In the above-mentioned embodiments, descriptions have been given of the multiplexing of two UCIs (e.g., two HARQ-ACKs, or one SR and one HARQ), and the multiplexing of three UCIs (e.g., two HARQ-ACKs and one SR), but the number of UCIs to be multiplexed is not limited to two or three and may be four or more.

6. In the above-mentioned embodiments a case has been described where terminal 200 controls the transmission of UCIs having different priorities based on the number of UCI bits; however, terminal 200 may control the UCI transmission based on another parameter, not limited to the number of UCI bits.

In one example, terminal 200 may control the multiplexing of UCIs based on the PUCCH format for each of the UCIs having different priorities. For example, in the case of PUCCH format 0 or PUCCH format 1, terminal 200 may apply the similar operation as in the case where the number of UCI bits is up to two bits in the above-mentioned embodiments. Further, for example, in the case of PUCCH format 2, 3, or 4, terminal 200 may apply the similar operation as in the case where the number of UCI bits is more than two bits in the above-mentioned embodiments.

Meanwhile, for example, terminal 200 may control the multiplexing of UCIs based on information on the number of times of encoding on the UCIs (e.g., upper limit value on the number of times of encoding). In one example, terminal 200 may apply the Separate coding when the number of times of encoding by the Polar code is less than a threshold (e.g., less than two) in a situation where the application of the Separate coding is assumed, and the terminal may apply the Joint coding when the number of times of encoding by the Polar code is the threshold or more (e.g., two or more) in a situation where the application of the Separate coding is assumed.

Further, terminal 200 may control the UCI multiplexing based on, for example, a combination of at least two of the number of UCI bits, a PUCCH format, and a threshold on the number of times of encoding.

Further, in the above-mentioned embodiments, the uplink communication between base station 100 and terminal 200 has been assumed. However, an exemplary embodiment of the present disclosure is not limited to this and may be applied to downlink communication or communication between terminals (e.g., sidelink communication).

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink. The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel (Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slots, subslots, minislots, or time resource units, such as symbols, Orthogonal Frequency Division Multiplexing (OFDM) symbols, Single Carrier-Frequency Division Multiple Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large latency compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are inter-connected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 8 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split between NG-RAN and 5GC in 5G NR>

Figure 9:
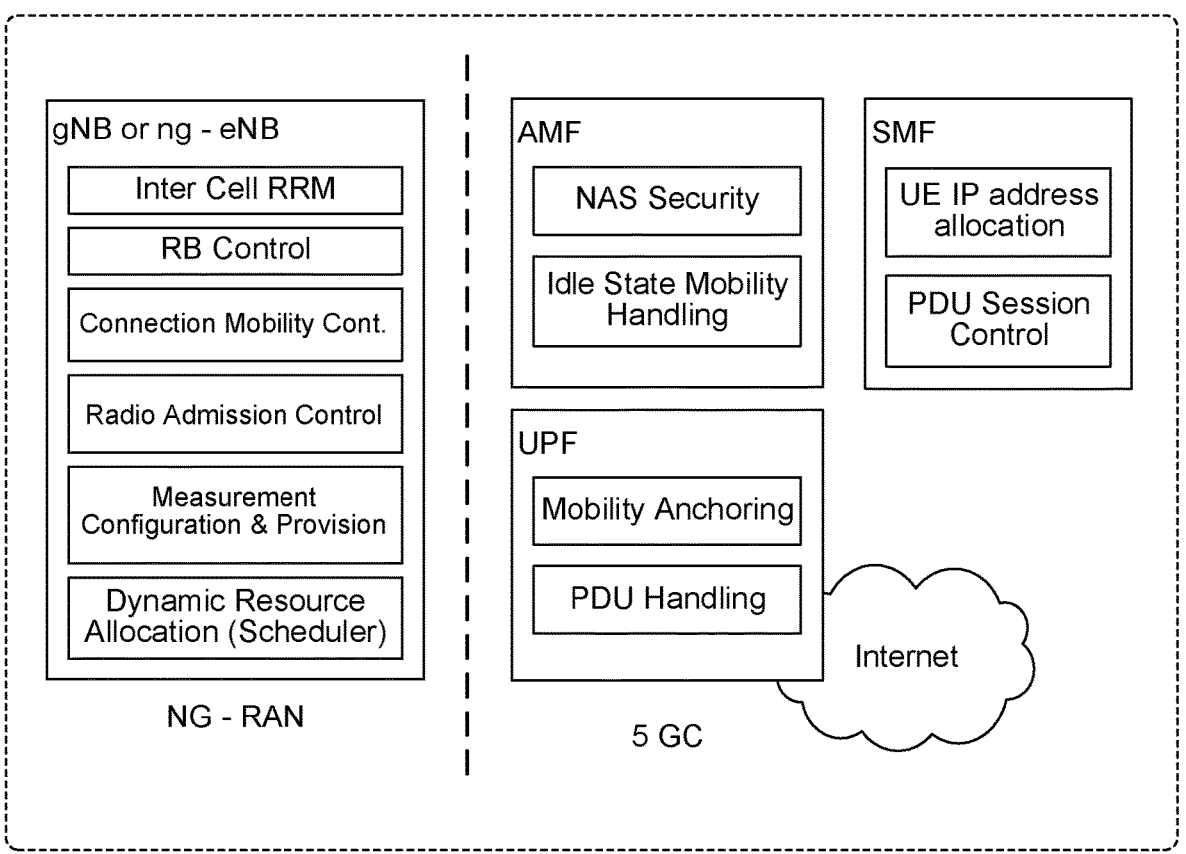
FIG. 9 schematically illustrates a functional split between Next Generation-Radio Access Network (NG-RAN) and 5th Generation Core (5GC)

FIG. 9 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 10:
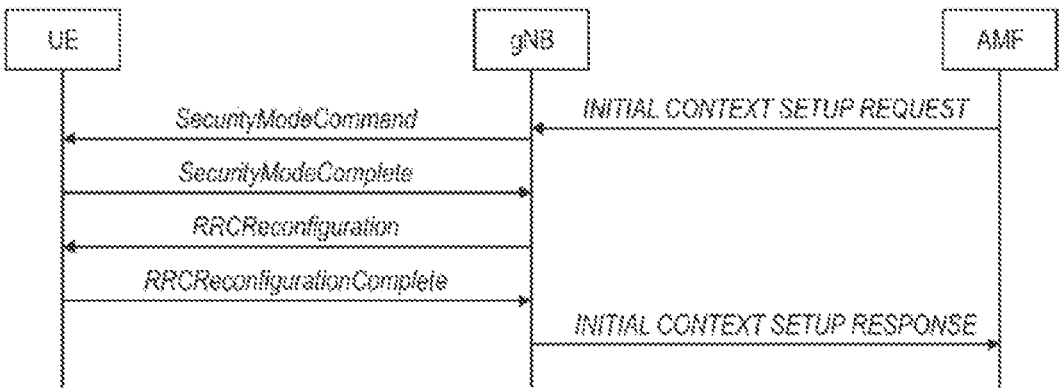
FIG. 10 is a sequence diagram of a Radio Resource Control (RRC) connection setup/reconfiguration procedure.

FIG. 10 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 11:
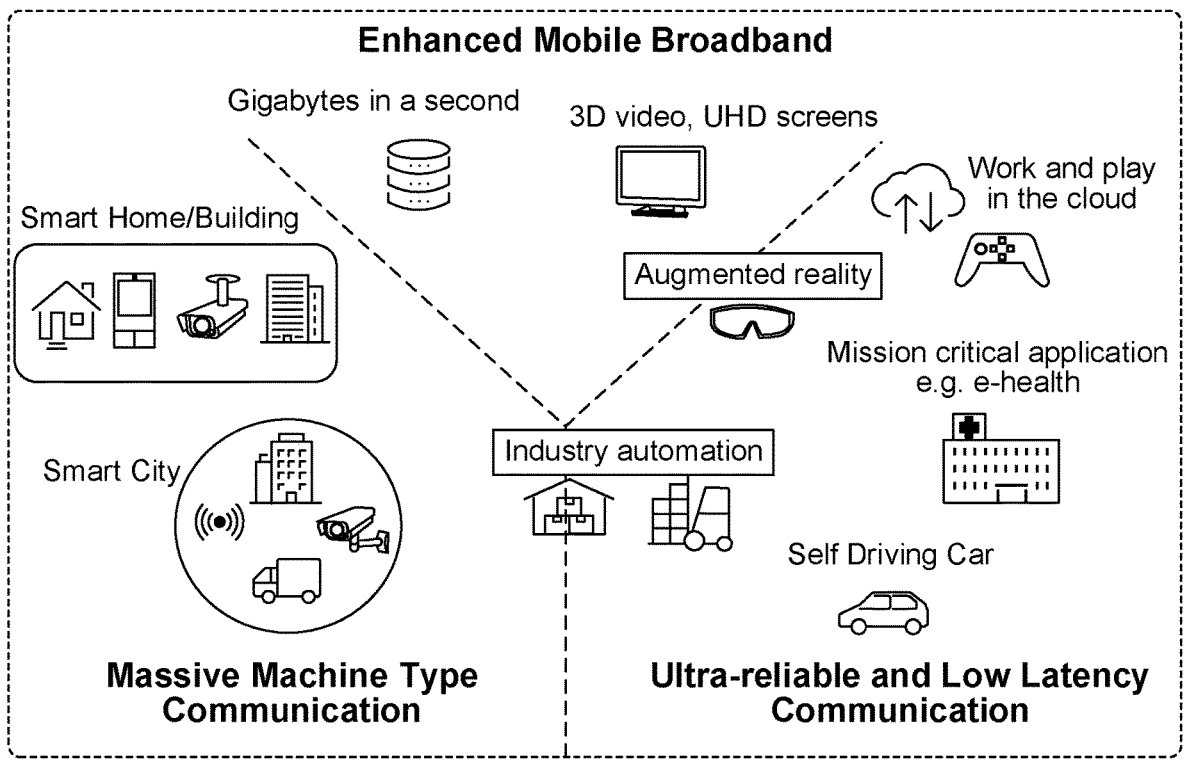
FIG. 11 schematically illustrates usage scenarios of enhanced Mobile BroadBand (eMBB), massive Machine Type Communications (mMTC), and Ultra Reliable and Low Latency Communications (URLLC)

FIG. 11 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 11 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (config-ured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few µs (where the value can be one or a few µs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/rep-etition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 10. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 12:
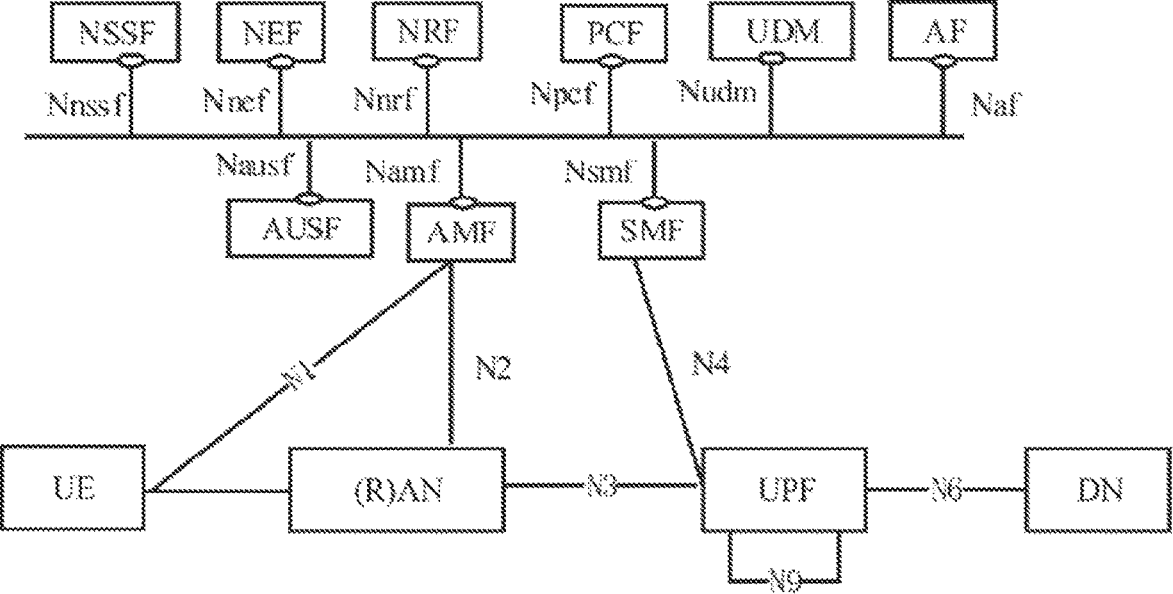
FIG. 12 is a block diagram illustrating an exemplary 5G system architecture for a non-roaming scenario.

FIG. 12 illustrates a 5G NR non-roaming reference architecture (see TS 23.501 v16.1.0, section 4.23). An Application Function (AF) (e.g., an external application server hosting 5G services, exemplarily described in FIG. 11) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 12 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, varies a parameter used for transmission of a plurality of uplink control signals having different priorities, in accordance with information on a size of at least one of the plurality of uplink control signals; and transmission circuitry, which, in operation, transmits the plurality of uplink control signals.

In an exemplary embodiment of the present disclosure, the information on the size indicates a total number of bits for the plurality of uplink control signals.

In an exemplary embodiment of the present disclosure, the information on the size indicates a format of a channel that is used for transmission of at least one of the plurality of uplink control signals.

In an exemplary embodiment of the present disclosure, the control circuitry controls multiplexing of the plurality of uplink control signals, based on information on the number of times of encoding on at least one of the plurality of uplink control signals.

In an exemplary embodiment of the present disclosure, the parameter corresponds to at least one of an encoding method for the plurality of uplink control signals, a resource mapping method for the plurality of uplink control signals, and/or a format of a channel that is used for transmission of a multiplexed signal.

In an exemplary embodiment of the present disclosure, the encoding method includes a first encoding method in which the plurality of uplink control signals is jointly encoded, and a second encoding method in which the plurality of uplink control signals is separately encoded.

In an exemplary embodiment of the present disclosure, the control circuitry configures the first encoding method in a case where the size of each of a first uplink control signal and a second uplink control signal is equal to or less than a first threshold or a case where the size of each of the first uplink control signal and the second uplink control signal is larger than a second threshold that is larger than the first threshold, and configures the second encoding method in a case where the size of at least one of the first uplink control signal and/or the second uplink control signal is larger than the first threshold and equal to or less than the second threshold.

In an exemplary embodiment of the present disclosure, the control circuitry configures the first encoding method in a case where the size of at least one of a first uplink control signal and/or a second uplink control signal is equal to or less than a threshold, and configures the second encoding method in a case where the size of each of the first uplink control signal and the second uplink control signal is larger than the threshold.

In an exemplary embodiment of the present disclosure, the control circuitry configures the first encoding method in a case where the size of an either uplink control signal of a first uplink control signal and a second uplink control is equal to or less than a threshold, and configures the second encoding method in a case where the size of the either uplink control signal is larger than the threshold.

In an exemplary embodiment of the present disclosure, a code used for the encoding method includes a Repetition code, a Reed Muller code, or a Polar code.

In an exemplary embodiment of the present disclosure, the plurality of uplink control signals includes a response signal having a first priority and a response signal having a second priority that is higher than the first priority.

In an exemplary embodiment of the present disclosure, the plurality of uplink control signals includes a response signal having a first priority and a scheduling request having a second priority that is higher than the first priority.

In an exemplary embodiment of the present disclosure, the plurality of uplink control signals includes a response signal having a first priority, a response signal having a second priority that is higher than the first priority, and a scheduling request having the second priority.

A communication method according to an exemplary embodiment of the present disclosure includes: varying, by a terminal, a parameter used for transmission of a plurality of uplink control signals having different priorities, in accordance with information on a size of at least one of the plurality of uplink control signals; and transmitting, by the terminal, the plurality of uplink control signals.

The disclosure of Japanese Patent Application No. 2020-212654, filed on Dec. 22, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A terminal, comprising:
control circuitry, which, in operation, determines a physical uplink control channel (PUCCH) resource; and
a transmitter, which, in operation, transmits uplink control information on the PUCCH resource,
wherein the uplink control information includes a first Hybrid Automatic Repeat Request Acknowledgement (HARQ-ACK) information of a first priority and a second HARQ-ACK information of a second priority, which is a higher priority than the first priority;
in a case the uplink control information includes the first HARQ-ACK information of the first priority, the second HARQ-ACK information of the second priority, and a Scheduling Request of the second priority, the uplink control information is transmitted on the PUCCH resource, and
in a case another uplink control information includes the first HARQ-ACK information of the first priority and the Scheduling Request of the second priority, the Scheduling Request of the second priority is transmitted in the another uplink control information and the first HARQ-ACK information of the first priority is dropped.

2. The terminal according to claim 1, wherein the PUCCH resource is determined from a PUCCH resource set of the second priority.

3. The terminal according to claim 1, wherein the uplink control information is transmitted by using a PUCCH format 0 or a PUCCH format 1 in a case a number of bits for the uplink control information is two bits or less.

4. The terminal according to claim 1, wherein the uplink control information is transmitted by using a PUCCH formats 2, 3 or 4 in a case a number of bits for the uplink control information is more than two bits.

5. The terminal according to claim 4, wherein the first HARQ-ACK information and the second HARQ-ACK information are coded separately.

6. The terminal according to claim 1, wherein the first HARQ-ACK information is coded by using a block coding scheme, and the second HARQ-ACK information is coded by using a repetition.

7. The terminal according to claim 1, wherein a mapping to a resource of the first HARQ-ACK information is determined based on a total resource and on a mapping to a resource of the second HARQ-ACK information.

8. The terminal according to claim 1, wherein the first HARQ-ACK information is coded by using a polar coding scheme, and the second HARQ-ACK information is coded by using a repetition.

9. The terminal according to claim 1, wherein the first HARQ-ACK information is coded by using a block coding scheme, and the second HARQ-ACK information is coded by a polar coding scheme.

10. A communication method, comprising:
determining a physical uplink control channel (PUCCH) resource; and
transmitting uplink control information on the PUCCH resource,
wherein the uplink control information includes a first Hybrid Automatic Repeat Request Acknowledgement (HARQ-ACK) information of a first priority and a second HARQ-ACK information of a second priority, which is a higher priority than the first priority;
in a case the uplink control information includes the first HARQ-ACK information of the first priority, the second HARQ-ACK information of the second priority, and a Scheduling Request of the second priority, the uplink control information is transmitted on the PUCCH resource, and
in a case another uplink control information includes the first HARQ-ACK information of the first priority and the Scheduling Request of the second priority, the Scheduling Request of the second priority is transmitted in the another uplink control information and the first HARQ-ACK information of the first priority is dropped.

11. The communication method according to claim 10, wherein the PUCCH resource is determined from a PUCCH resource set of the second priority.

12. The communication method according to claim 10, wherein the uplink control information is transmitted by using a PUCCH format 0 or a PUCCH format 1 in a case a number of bits for the uplink control information is two bits or less.

13. The communication method according to claim 10, wherein the uplink control information is transmitted by using a PUCCH formats 2, 3 or 4 in a case a number of bits for the uplink control information is more than two bits.

14. The communication method according to claim 13, wherein the first HARQ-ACK information and the second HARQ-ACK information are coded separately.

15. The communication method according to claim 10, wherein the first HARQ-ACK information is coded by using a block coding scheme, and the second HARQ-ACK information is coded by using a repetition.

16. The communication method according to claim 10, wherein a mapping to a resource of the first HARQ-ACK information is determined based on a total resource and on a mapping to a resource of the second HARQ-ACK information.

17. The communication method according to claim 10, wherein the first HARQ-ACK information is coded by using a polar coding scheme, and the second HARQ-ACK information is coded by using a repetition.

18. The communication method according to claim 10, wherein the first HARQ-ACK information is coded by using a block coding scheme, and the second HARQ-ACK information is coded by a polar coding scheme.

* * * * *